United States Patent [19]

Banno et al.

[11] Patent Number: 5,645,462

[45] Date of Patent: Jul. 8, 1997

[54] ELECTRON-EMITTING DEVICE, AND ELECTRON BEAM-GENERATING APPARATUS AND IMAGE-FORMING APPARATUS EMPLOYING THE DEVICE

[75] Inventors: Yoshikazu Banno, Ebina; Ichiro Nomura; Hidetoshi Suzuki, both of Atsugi; Takashi Noma, Tsukuba; Rie Ueno, Hadano, all of Japan

[73] Assignee: Canon Kabushiki Kaisha, Tokyo, Japan

[21] Appl. No.: 590,511

[22] Filed: Jan. 24, 1996

Related U.S. Application Data

[62] Division of Ser. No. 304,216, Sep. 12, 1994, Pat. No. 5,530,314, which is a continuation of Ser. No. 956,974, Oct. 6, 1992, abandoned.

[30] Foreign Application Priority Data

Oct. 8, 1991 [JP] Japan .................... 3-260360

[51] Int. Cl.$^6$ .................... H01J 9/02
[52] U.S. Cl. .................... 445/51
[58] Field of Search .................... 445/3, 24, 50, 445/51

[56] References Cited

U.S. PATENT DOCUMENTS

| 4,954,744 | 9/1990 | Suzuki et al. ................ 313/336 |
| 5,023,110 | 6/1991 | Nomura et al. ................ 427/78 X |

FOREIGN PATENT DOCUMENTS

| 0343645 | 11/1989 | European Pat. Off. . |
| 0388984 | 9/1990 | European Pat. Off. . |
| 1-200532 | 8/1989 | Japan . |
| 2-56822 | 2/1990 | Japan . |
| 2-247937 | 10/1990 | Japan . |

OTHER PUBLICATIONS

Abstract of JP 89,657 Mar. 29, 1994.

Abstract of JP 19,656 Jan. 23, 1989.

"Strong Electron Emission From Patterned Tin-Indium Oxide Thin Films", M. Hartwell, et al., International Electron Devices Meeting, 1975 pp. 519–521.

"Electrical Conduction And Electron Emission Of Discontinuous Thin Films", G. Dittmer, Thin Solid Films, 1972, pp. 316–329.

"The Emissions Of Hot Electrons And The Field Emission Of Electrons From Tin Oxide", M.I. Elinson, et al., Radio Engineering and Electronic Physics, 1965, pp. 1290–1296.

Primary Examiner—Kenneth J. Ramsey
Attorney, Agent, or Firm—Fitzpatrick, Cella, Harper & Scinto

[57] ABSTRACT

An electron-emitting device having a electron-emitting portion between electrodes on a substrate comprises a region A and a region B, the region A being electrically connected through the region B to at least one of the electrodes, electric conductivity $\sigma_1$ of the material mainly constituting the region A and electric conductivity of the material $\sigma_2$ mainly constituting the region B being in the relation of $\sigma_1 > \sigma_2$, and the region A being the electron-emitting portion. An electron beam-generating apparatus and image-forming apparatus comprise the electron-emitting device and a modulation means for modulating the electron beams emitted from the electron-emitting elements in accordance with information signals.

3 Claims, 13 Drawing Sheets

$W_2 = W_{21} + W_{22}$

ELECTRON-EMITTING DEVICE, AND ELECTRON BEAM-GENERATING APPARATUS AND IMAGE-FORMING APPARATUS EMPLOYING THE DEVICE

This application is a division of application Ser. No. 08/304,216 filed Sep. 12, 1994, U.S. Pat. No. 5,530,314 which is a continuation of application Ser. No. 07/956,974 filed Oct. 6, 1992, abandoned.

BACKGROUND OF THE INVENTION

1. Field of the Invention

The present invention relates to a cold-cathode type of electron-emitting device. The present invention also relates to an electron beam-generating apparatus, and an image-forming apparatus employing the electron-emitting device.

2. Related Background Art

Cold cathode devices are known as devices capable of emitting electrons with a simple structure. For example, a cold cathode device is reported by M. I. Elinson (Radio Eng. Electron Phys., vol 10, pp. 1290–1296 (1965)). These devices are based on the phenomenon that electrons are emitted by flowing electric current in parallel through a thin film of small area formed on a substrate. Such devices are called generally surface-conduction type electron-emitting devices. The surface-conduction type electron-emitting devices include the ones using a thin $SnO_2(Sb)$ film developed by M. I. Elinson as mentioned above; the ones using a thin Au film (G. Dittmer: "Thin Solid Films", vol. 9, p. 317, (1972)); and the ones using a thin ITO film (M. Hartwell and C. G. Fonstad: IEEE Trans. ED Conf., p. 519 (1983)).

A typical construction of the surface conduction type electron-emitting device is shown in FIG. 23. This device comprises electrodes 32, 33 for electric connection, a thin film 35 formed from an electron-emitting material, a substrate 31, and an electron-emitting portion 34. Conventionally, in such a surface conduction type electron-emitting device, the electron-emitting portion is formed by electric current-heating treatment called "forming". In this treatment, electric voltage is applied between the electrode 32 and the electrode 33 to flow electric current through the thin film 35 and to destroy, deform, or denature locally the thin film 35 by utilizing Joule heat generated. Thereby, the electron-emitting portion 34 which has high electric resistance is formed, thus the function of electron emission being obtained. Here the state of the high electric resistance results from discontinuity of the thin film 35 in which cracks of 0.5 to 5 μm long are formed locally and the cracks have an island structure therein. The island structure means a state of the film that the film contains fine particles of several tens of angstroms to several microns in diameter and the particles are discontinuous but the film is electrically continuous. In conventional surface conduction type electron-emitting device, voltage is applied to the aforementioned discontinuous high-resistance film through the electrodes 32, 33 to flow current at the surface of the device, thereby electron being emitted from the fine particles.

A novel surface conduction type electron-emitting device in which electron-emitting fine particles are distributed between electrode was disclosed by the inventors of the present invention in Japanese Patent Application Laid-Open Nos. Hei-1-200532 and Hei-2-56822. This electron-emitting device has advantages that (1) high electron-emitting efficiency can be obtained, (2) the device can be readily prepared because of its simple construction, (3) many devices can be arranged on one and the same substrate, and so forth. FIG. 24 shows a typical construction of such a surface conduction type electron-emitting device, which comprises electrodes 32, 33 for electric connection, an electron-emitting portion 36 having electron-emitting fine particles dispersed therein, and an insulating substrate 31.

In recent years, attempts are made to use the aforementioned surface conduction type electron-emitting device for an image-forming apparatus. One example is shown in FIG. 25, which illustrates an image-forming apparatus having a number of the aforementioned electron-emitting devices arranged therein. The apparatus comprises electrodes 42, 43, electron-emitting portions 44, grid electrodes 45, electron-passing holes 46, and an image-forming member 47. This image-forming member is made of a material such as fluorescent materials and resist materials which causes light-emission, color change, electrification, denaturing or like change on collision of electrons. With this image-forming apparatus, the linear electron sources having a plurality of electron-emitting portions 44 arranged between the electrodes 42, 43, and grid electrodes 45 are driven in XY matrix, and electrons are made to collide against the image-forming member 47 in correspondence with information signals to form an image.

The above-mentioned surface conduction type electron-emitting devices exhibit favorable electron-emitting characteristics under a vacuum of about $10^{-5}$ to $10^{-9}$ torr. However, they cause variation of the emitting current to an extent of about 25 to 40% with the decrease of the vacuum degree. If the variation of the emitting current is extremely large, the aforementioned image-forming apparatus, in particular, is seriously affected. For example, an electron beam display apparatus shown in FIG. 25, if the image-forming member is a a fluorescent material, involves problems that (1) the luminance of the fluorescent material becomes irregular owing to the variation of the electron emission quantity of the respective electron-emitting devices, (2) the display flickers owing to the fluctuation of light emission quantity of respective bright spots on the fluorescent material.

SUMMARY OF THE INVENTION

An object of the present invention is to provide an electron-emitting device and an electron-beam-generating apparatus which causes little fluctuation of emitted current.

Another object of the present invention is to provide an electron-emitting device and an electron-beam-generating apparatus which exhibit high electron-emitting efficiency and have long life.

A further object of the present invention is to provide an image-forming apparatus giving a sharp image with high contrast, in particular an image-forming apparatus giving little irregularity of luminance of a fluorescent image and little flickering of display.

According to an aspect of the present invention, there is provided an electron-emitting device having an electron-emitting portion between electrodes on a substrate, comprising a region A and a region B, the region A being connected through the region B to at least one of the electrodes, electroconductivity $\sigma_1$ of the material mainly constituting the region A and electroconductivity of the material $\sigma_2$ mainly constituting the region B being in the relation of $\sigma_1 \wedge \sigma_2$, and the region A being the electron-emitting portion.

According to another aspect of the present invention, there is provided an electron beam-generating apparatus, comprising a plurality of the electron-emitting devices described above, and a modulation means for modulating the electron beams emitted from the electron-emitting devices in accordance with information signals.

According to still another aspect of the present invention, there is provided an image-forming apparatus, comprising a plurality of the electron-emitting devices described above, a modulation means for modulating the electron beams emitted from the electron-emitting devices in accordance with information signals, and an image-forming member for forming an image on receiving the electron beams.

According to a further aspect of the present invention, there is provided an image-forming apparatus, comprising a plurality of the electron-emitting devices described above, a modulation means for modulating the electron beams emitted from the electron-emitting devices in accordance with information signals, and a light-emitting material for emitting light on receiving the electron beams.

According to a still further aspect of the present invention, there is provided an image-forming apparatus, comprising a plurality of the electron-emitting devices described above, a modulation means for modulating the electron beams emitted from the electron-emitting devices in accordance with information signals, and light-emitting materials for emitting light of three primary color of red, green, and blue on receiving the electron beams.

DESCRIPTION OF THE PREFERRED EMBODIMENT

Figure 1:
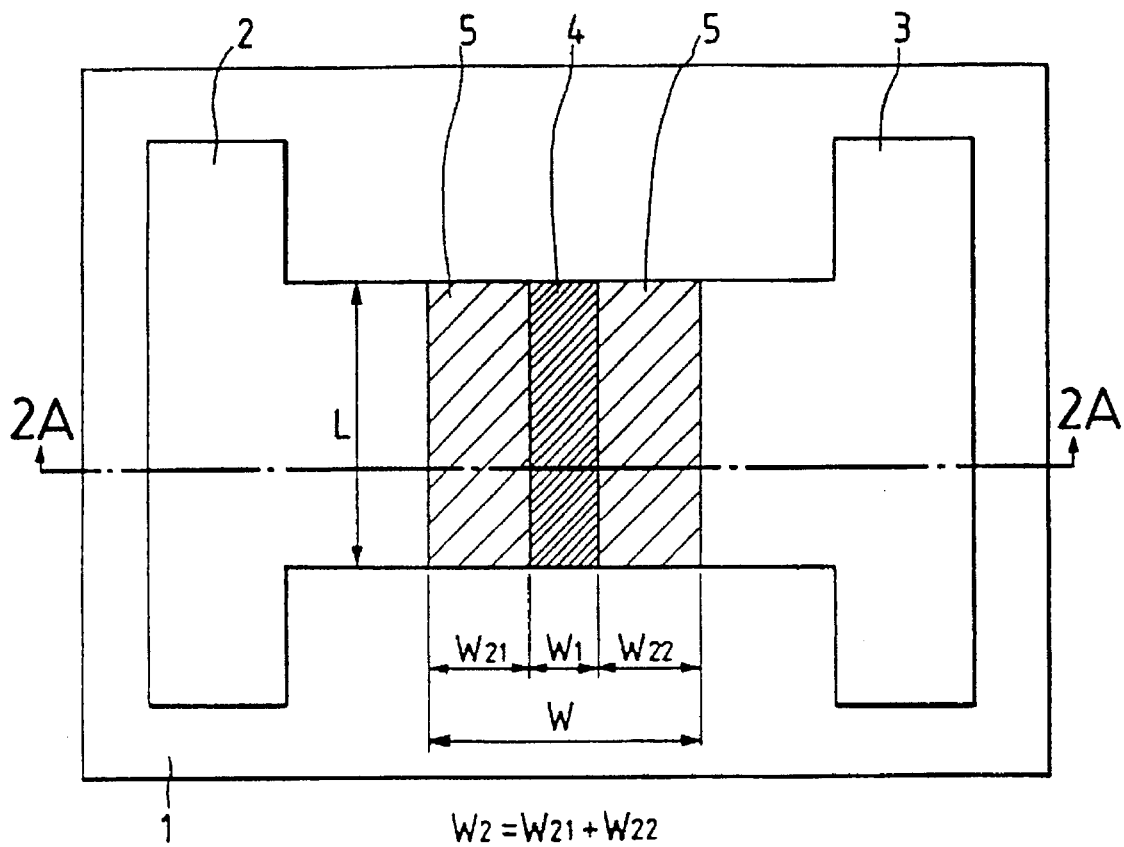
FIG. 1 is a plan view illustrating schematically the construction of an electron-emitting device of the present invention.
Figure 2:
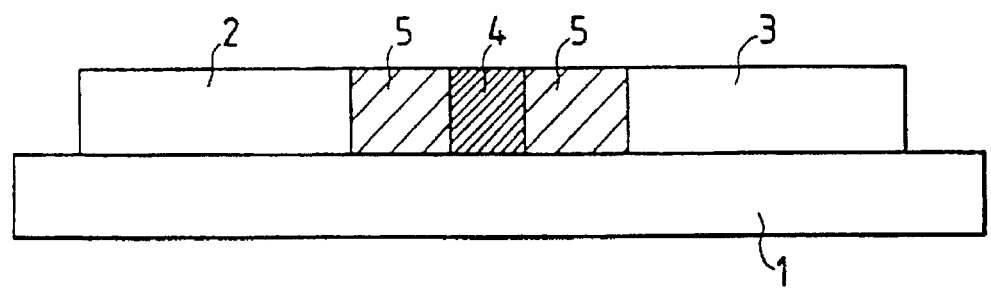
FIG. 2 shows a sectional view of the electron-emitting device of FIG. 1 at the line 2A—2A.
Figure 3:
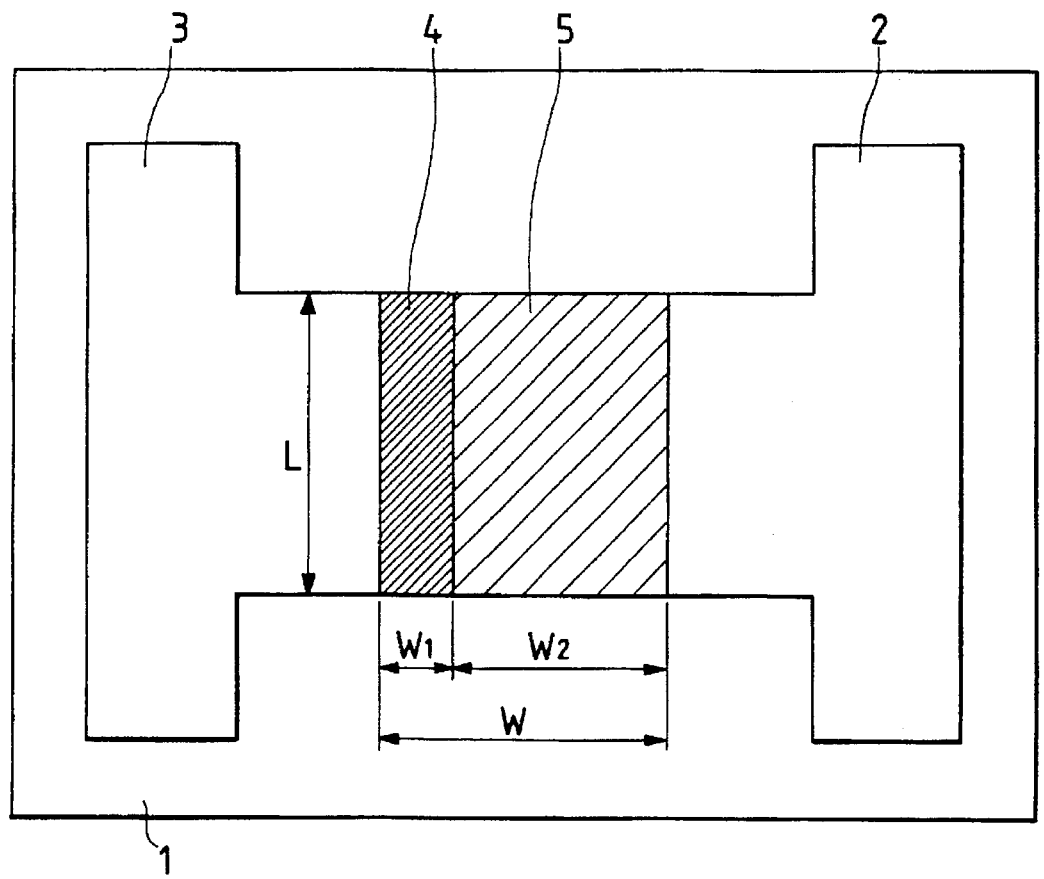
FIG. 3 is a plan view illustrating schematically the construction of another electron-emitting device of the present invention.
Figure 4:
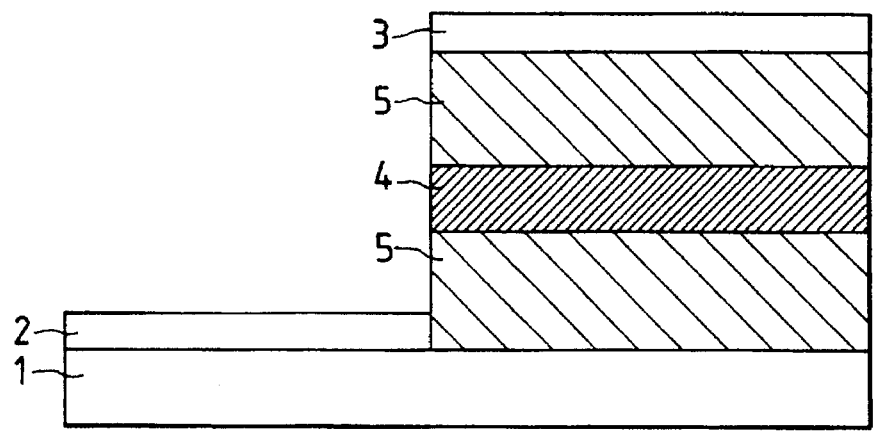
FIG. 4 is a sectional view illustrating schematically the construction of still another electron-emitting device of the present invention.

The electron-emitting device of the present invention is described below in detail. Firstly, the characteristic part of the electron-emitting device is explained by reference to FIG. 1 (plan view) and FIG. 2 (sectional view at 2A—2A in FIG. 1). In FIG. 1 and FIG. 2, the numeral 1 denotes an insulating substrate; 2 and 3, each an device electrode; 4, a region A; and 5, a region B. The main constituting materials of the region A and the region B are different from each other, the materials having different electric conductivity. The electric conductivity $\sigma_1$ of the main material of the region A and the electric conductivity $\sigma_2$ of the main material of the region B are required to satisfy the relation (a) of $\sigma_1 \wedge \sigma_2$. Further in the electron-emitting device of the present invention, the regions made of the different materials in the relation (a) are required to be arranged in a specified positional relation between the electrodes. As clearly shown in FIG. 1 and FIG. 2, the region A is connected to the electrodes 2 and 3 through the regions B. The present invention includes the embodiment where the arrangement of the region A relative to the region B is such as shown in FIG. 3. In the embodiment of FIG. 3, the region A is connected to the electrode 2 through the region B, while it is connected directly to the electrode 3. That is, in the electron-emitting device of the present invention, the region A is placed so as to be brought into contact indirectly through the region B with at least one of the electrodes. Further, the embodiment as shown in FIG. 4 is also included in the present invention. In this embodiment, a pair of electrodes, the region A, and the regions B are laminated. The order of the lamination is such that the region A is brought into contact through the region B with at least one of the pair of the electrodes. The electron-emitting device of the present invention emits electron beams from the region A (denoted by the numeral 4 in FIGS. 1, 2, 3, end 4) when electric current (device current) is made to flow through the region A and the region(s) B by application of voltage between the electrodes 2 and the electrode 3. Incidentally, the electron-emitting devices shown in FIGS. 1, 2, and 3 are only examples of the embodiment of the present invention, and the present invention is not limited thereto, as is clear from the later description. With the construction as shown above, the electron-emitting device of the present invention makes it possible to decrease remarkably the fluctuation rates of the device current and the emission current and to raise electron emission efficiency and lengthen the life.

More preferred embodiments are described below. In preferred embodiments of the present invention, the electron-emitting device satisfies the relations (b): $\sigma_1 \wedge \sigma_2$ and $10^2 \leq (\sigma_1 \cdot S_2)/(\sigma_2 \cdot S_1) \leq 10^7$ (where $S_1$ is the area of the region A, and $S_2$ is the area of the region B); or the relations (c): $\sigma_1 \wedge \sigma_2$ and $1 \leq (\sigma 1 \cdot W2)/(\sigma 2 \cdot W1) \leq 10^9$ (where W1 is the width of the region A, and $W_2$ is the width of the region B), from the standpoints of further decreasing the fluctuation rates of the device current and of the emission current. When the electron-emitting devices satisfying the relations (b) or (c) are applied to an electron beam-generating apparatus or an image-forming apparatus as described later, the electron emission characteristics (e.g., fluctuation rates of device current and emission current, electron emission efficiency, etc.) become highly uniform among a plurality of the electron-emitting devices (or a plurality of electron-emitting portion). Thereby, no irregularity of the emission is caused among the electron beams, and fine images are formed with extremely high contrast. In the relations (b), the areas $S_1$ and $S_2$ are preferably in relation of $S_1 \frac{3}{4} S_2$. In the relations (c), the width $W_1$ of the region A is preferably in a range of from 0.01 µm to 10 µm, and the width $W_2$ of the region B is preferably in a range of from 0.1 µm to 10 µmm.

In setting up the above parameters for the electron-emitting device of the present invention, the constituting materials for the region A and the region B are selected firstly. The region A and the region B of the electron-emitting device of the present invention are made of an electroconductive film. In particular, the film is desirably constituted mainly from an electroconductive fine particulate material (hereinafter referred to as fine particle film). The diameter of the fine particles is particularly preferably in a range of from 10 Å to 10 µm from the standpoint of driving the device efficiently at a low driving voltage. If the particle diameter is excessively large, the film behaves as a continuous thin film, thereby the region B particularly behaving as a body having a high resistance, and resulting in high driving voltage of the device. The fine particle film is not limited to the film made only of particles, but includes a thin film composed of fine particles dispersed in a medium of another substance, like a carbon film having the fine particles dispersed therein, provided that the film is mainly made of the fine particles. The region A and the region B are formed between the electrodes from the materials suitably selected so as to satisfy the relation of $\sigma_1 \wedge \sigma_2$: preferably $10^4 \Omega^{-1} m^{-1} \leq \sigma_2 \frac{3}{4} \sigma_1$. The suitable materials for constructing the region A are electroconductive materials having electric conductivity in a range of from $1\Omega^{-1}m^{-1}$ to $10^8 \Omega^{-1} m^{-1}$. The specific examples of particularly suitable materials include metals such as Pd, Ag, Au, Ti, In, Cu, Cr, Fe, Zn, Sn, Ta, W, and Pb; and electroconductive oxides such as PdO, SnO$_2$, and In$_2$O$_3$. On the other hand, the suitable materials for constructing the region B are electroconductive material having electric conductivity in a range of from $10^{-4} \Omega^{-1} m^{-1}$ to $10^6 \Omega^{-1} m^{-1}$. The specific examples of particularly suitable materials include borides such as $ZrB_2$, $HfB_2$, $LaB_6$, $CeB_6$, $YB_4$, and $GdB_4$; carbides such as TiC, ZrC, HfC, TaC, SiC, and WC; nitrides such as TiN, ZrN, and HfN; metals such as Nb, Mo, Rh, Hf, Ta, W, Re, It, Pt, Ti, Au, Ag, Cu, Cr, Al, Co, Ni, Fe, Pb, Pd, Cs, and Ba; metal oxides such as In$_2$O$_3$, SnO$_2$, Sb$_2$O$_3$, PdO, and PbO; semiconductors such as Si and Ge; carbon, AgMg, NiCu, PbSn, and so forth.

The main materials for the region A and the region B of the electron-emitting device of the present invention are preferably selected from the above specific examples such that the region A is constructed mainly from a metal and the region B is constructed mainly from the oxide or the nitride of the metal, since the oxidation-reduction or nitrogenation-reduction can be readily be conducted, thereby enabling precise formation of the region A or the region B as desired to give an electron-emitting device with little variation of characteristics of the device.

The examples of the combination are shown in Table 1 and Table 2 below.

TABLE 1

|  | Region A | Region B |
|---|---|---|
| Oxide | Pt | PtO |
|  | In | In$_2$O$_3$ |
|  | Ti | TiO |
|  | Cu | CuO |
|  | Cr | CrO$_2$ |
|  | Fe | Fe$_3$O$_4$ |
|  | Zn | ZnO |

TABLE 2

|  | Region A | Region B |
|---|---|---|
| Oxide | Sn | SnO$_2$ |
|  | Ta | Ta$_2$O$_5$ |
|  | W | WO$_3$ |
|  | Pb | PbO$_2$ |
| Nitride | Cr | CrN |
|  | Ta | TaN |
|  |  | Ta$_2$N |
|  | Ni | Ni$_3$N |

The region A and the region B of the electron-emitting device of the present invention are formed between the electrodes by applying the above-mentioned electroconductive material, for example, by gas deposition, dispersion coating, dipping, spinner coating, or a like coating method. The electric conductivity of the aforementioned electroconductive material is the inherent physical constant of the material. The width and the length of the regions between the electrodes, and the areas of the regions are designed as desired in preparation thereof. The material species of the region A and the region B having different electric conductivity and being connected electrically with the pair of the electrodes can be identified by electron beam diffraction, X-ray diffraction, or a like method. The width of the area of between the electrodes can be measured by scanning Auger or a like analysis method for a plurality of positions between the electrodes. The area of the regions are derived from the product of the width between the electrodes and the length between the electrodes.

Figure 14:
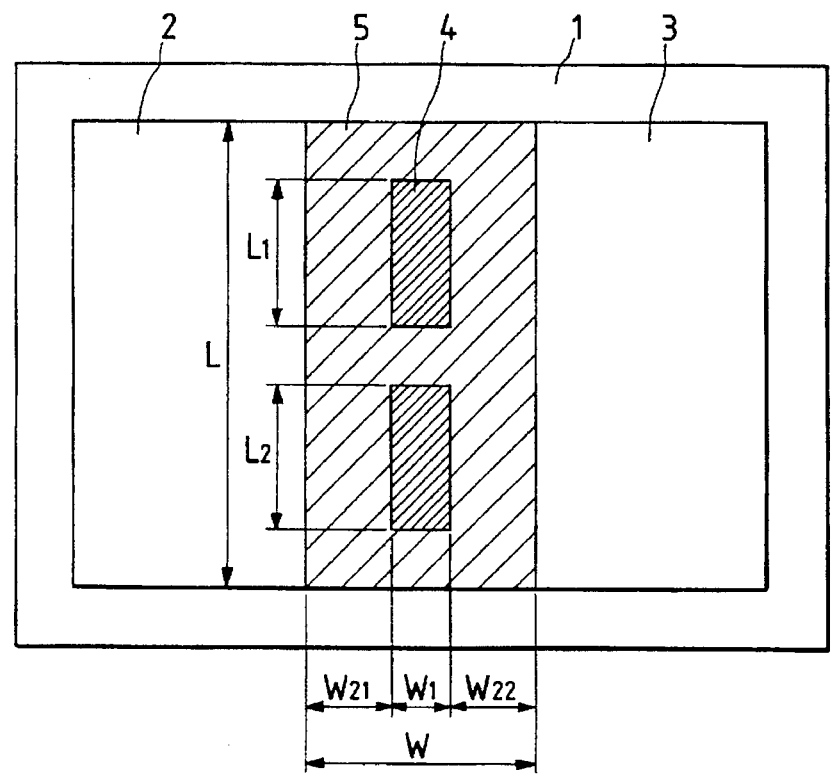
FIG. 14 is a plan view illustrating schematically the construction of still another electron-emitting device of the present invention.
Figure 15:
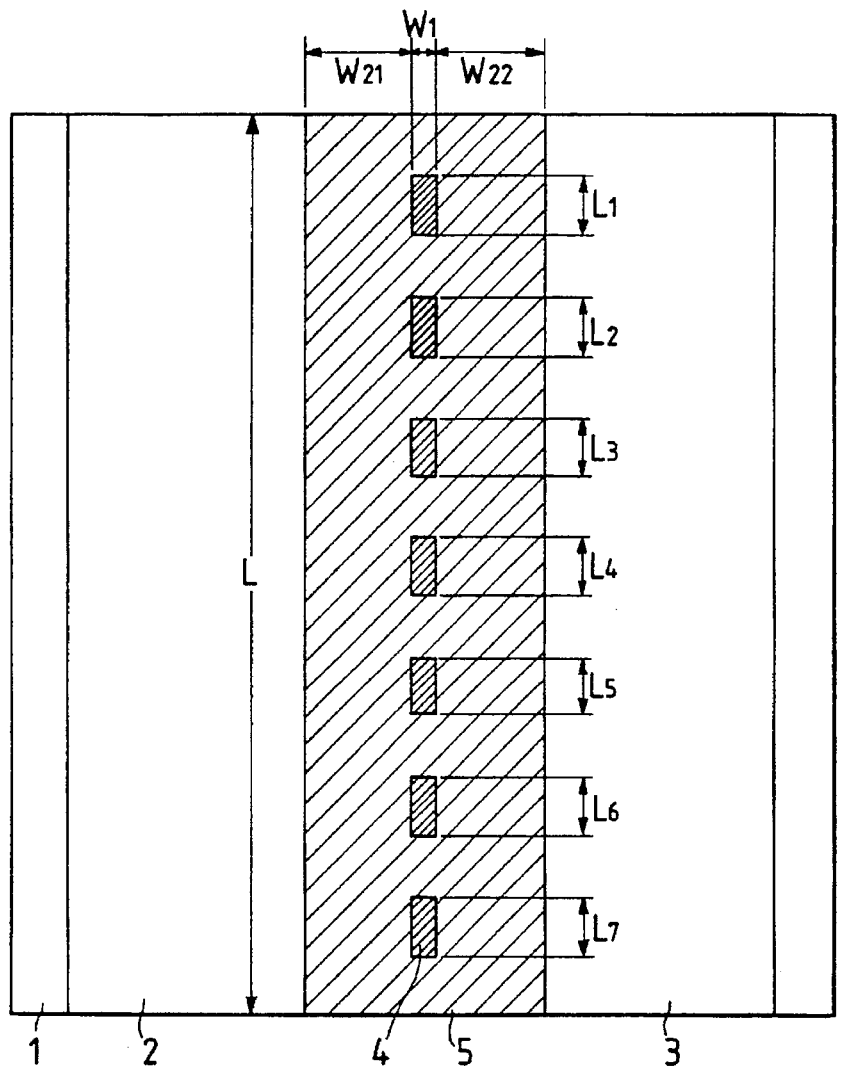
FIG. 15 is a plan view illustrating schematically the construction of still another electron-emitting device of the present invention.

Further, the substrate is usually made of an insulating material, such as glass substrate plates including soda glass, borosilicate glass, end quartz glass. The electrodes are used for applying voltage to the region A and the region B placed between the electrodes, and the material therefor is not specially limited provided that the material has sufficiently low resistance. The electrode is usually formed from a thin metal film. The electrodes are formed on the substrate normally by usual thin film forming technique and photolithography technique, at a desired spacing. The thickness of the electrodes is preferably not more than 8 μm, more preferably not more than 1 μm. The electron-emitting device of the present invention includes the embodiment in which the region A is provided in plurality between the electrodes as shown in FIG. 14 and FIG. 15.

The above-described electron-emitting device of the present invention has the advantage that fluctuation of the emission current is extremely low in comparison with the one of the prior art described above. Although the reason therefor is not clear yet, the inventors of the present invention consider as below. That is, the conventional electron-emitting device gives a large fluctuation of the emission current because of the reasons : 1) the structure of the island-shaped discontinuous film or the fine particle dispersion film changes by application of voltage to the device, causing the change of the device current (If), 2) gas molecules are adsorbed to or desorbed from the electron-emitting portion constructed of the islands or fine particles, causing the change of the work function, thereby resulting fluctuation of the emission current (Ie), and 3) ionized gas molecules formed near the electron-emitting portion collide against the electron-emitting portion to cause fluctuation of the emission current (Ie). Among the above reasons, the inventors of the present invention noticed the reason 1), and found that the fluctuation of emission current (Ie) can be decreased by suppressing the fluctuation of the device current (If). Accordingly the inventors investigated comprehensively the properties of the film placed between the electrodes of an electron-emitting device, and consequently completed the present invention. The inventors further considered the fluctuation of the device current (If) in the reason 1) above, and found that 1) the fluctuation of the device current tends to increase gradually with the driving time of the device; 2) the fluctuation of the device tends to become larger with smaller spacing between the electrodes; and 3) the fluctuation of the device tends to become larger with higher driving voltage. In the present invention, the fluctuation of the device current can be minimized. Thereby the life of the device can be further lengthened. and the spacings of the electrodes can be made smaller, whereby the electron-emitting portions can be arranged more finely. Therefore, an image-forming apparatus can be provided which gives more precise end sharper images.

In the present invention, when the above relation (a) is satisfied and the region A and the region B are arranged as above, a site having a sufficiently controlled and appropriate resistance is formed between at least one of the electrodes and the electron-emitting portion (namely the region A), whereby stable voltage is applied to the region A on application of voltage between the electrodes without pulsing current flow (rush current), and the change in the structure of the film constituting the region A can be decreased extremely. In particular, extremely small change in the film structure of the region A enables stable application of voltage between the electrodes, resulting elimination of abrupt change of the emission current and remarkable decrease of the fluctuation rate. Further in the present invention, by satisfying the above relation (b) or (c), the region B of the device exhibits resistance for further stabilizing the conduction of the device current (namely stabilizing resistance) to serve to stabilize the emission current.

Figure 5:
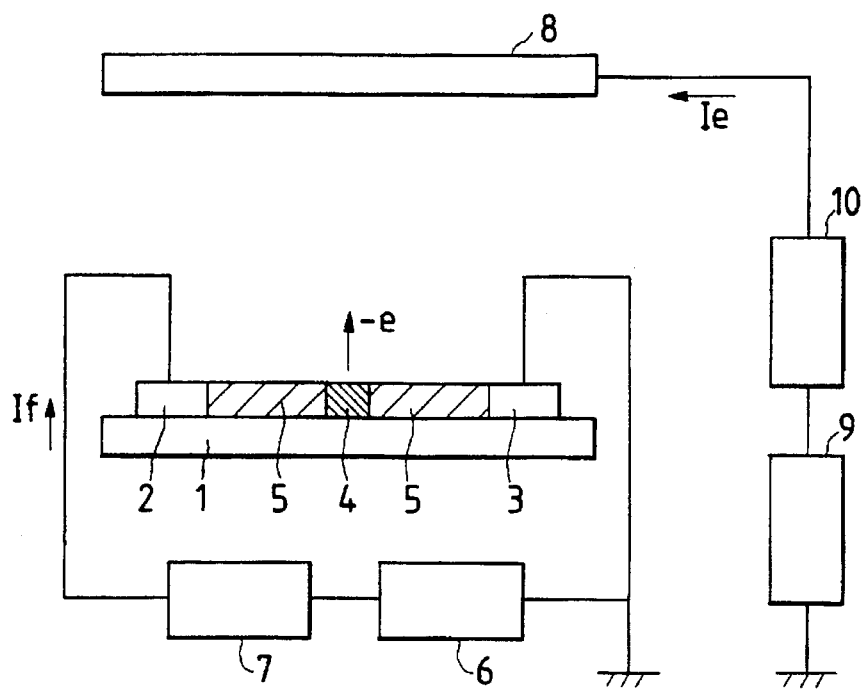
FIG. 5 illustrates schmatically the construction of a measuring apparatus for measuring the quantity of electric current in the device (device current) and the quantity of emitted electric current (emission current).
Figure 6:
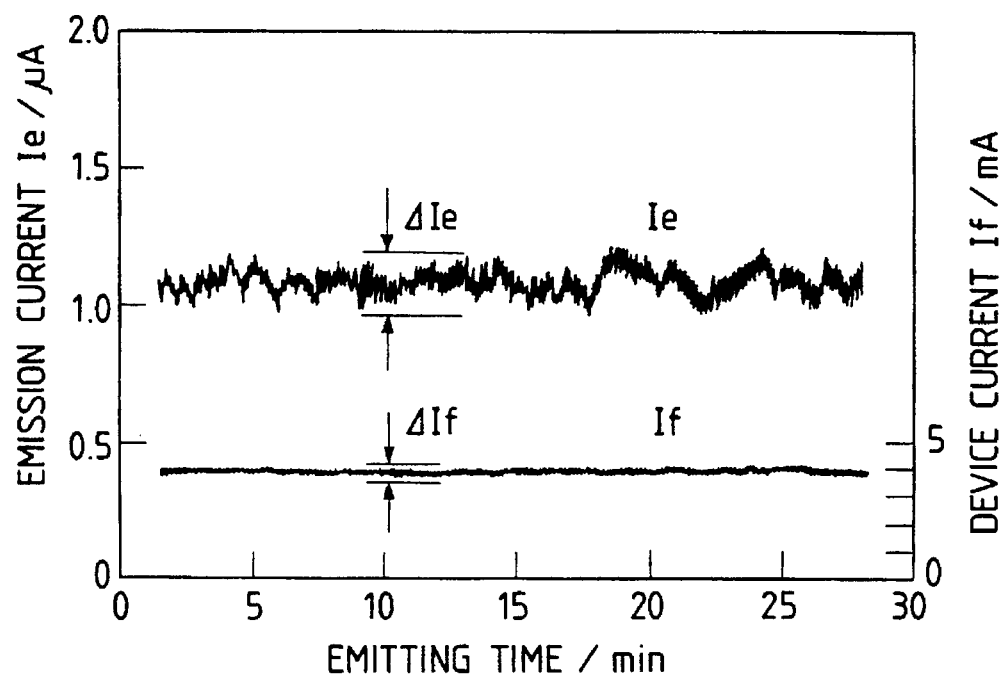
FIG. 6 shows the data of the device current and the emission current obtained with the measuring apparatus of FIG. 5.

The above-mentioned device current and the emission current are explained by reference to the schematic drawing (FIG. 5) of construction of a measuring apparatus. The measuring apparatus comprises an insulating substrate 1, electrodes 2 and 3, a region A (electron-emitting portion) 4, a region B 5, power source 6 for applying voltage to the device, an ammeter 7 for measuring the device current (If), an anode electrode 8 for measuring emission current emitted from the device, a high-voltage power source 9 for applying voltage to the anode electrode 8, and an ammeter 10 for measuring the emission current. The device current is the current measured by the ammeter 7, and the emission current is the current measured by the ammeter 10. The device current and the emission current of the electron-emitting device are measured with the electrodes 2 and 3 connected to the power source 6 and the ammeter 7 and placing above the electron emitting device the anode 8 connected to the power source 9 and the ammeter 10 under a vacuum degree of $1 \times 10^{-5}$ torr. From the results of the measurement, the fluctuation of the device curent and the emission current are represented by the fluctuation rates (%) as defined by the formula below:

Fluctuation rate of emission current $X = (\Delta Ie/Ie) \times 100 (\%)$

Fluctuation rate of device current $Y = (\Delta If/If) \times 100 (\%)$ where the symbols $\Delta Ie$ and $\Delta If$ are respectively fluctuation of the emission current and fluctuation of the device current not less than 1 Hz. From the results of the measurement, the electron-emitting device of the present invention is defined to be the one which exhibits the fluctuation rate of the emission current of not more than 15%, or the fluctuation rate of the device current of not more than 10%.

Figure 8:
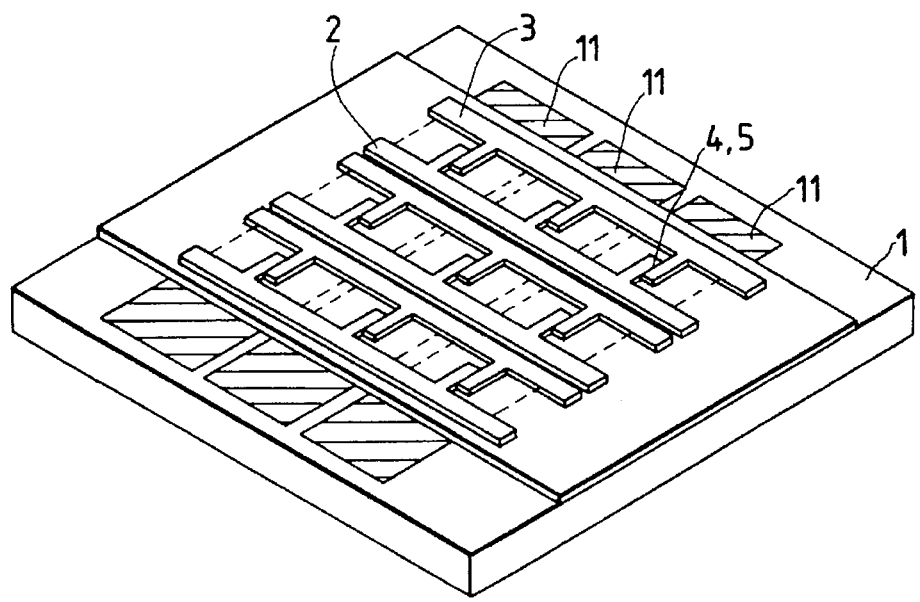
FIG. 8 is a perspective view illustrating schematically the construction of another electron beam-generating apparatus of the present invention.
Figure 9:
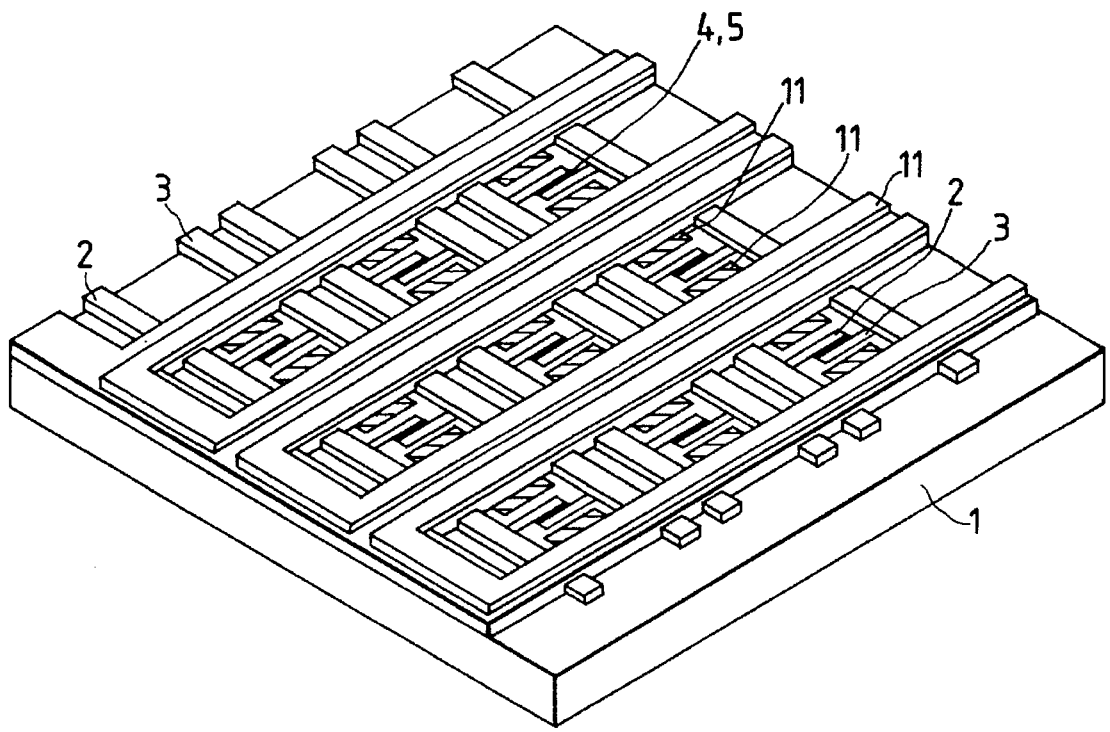
FIG. 9 is a perspective view illustrating schematically the construction of still another electron beam-generating apparatus of the present invention.
Figure 10:
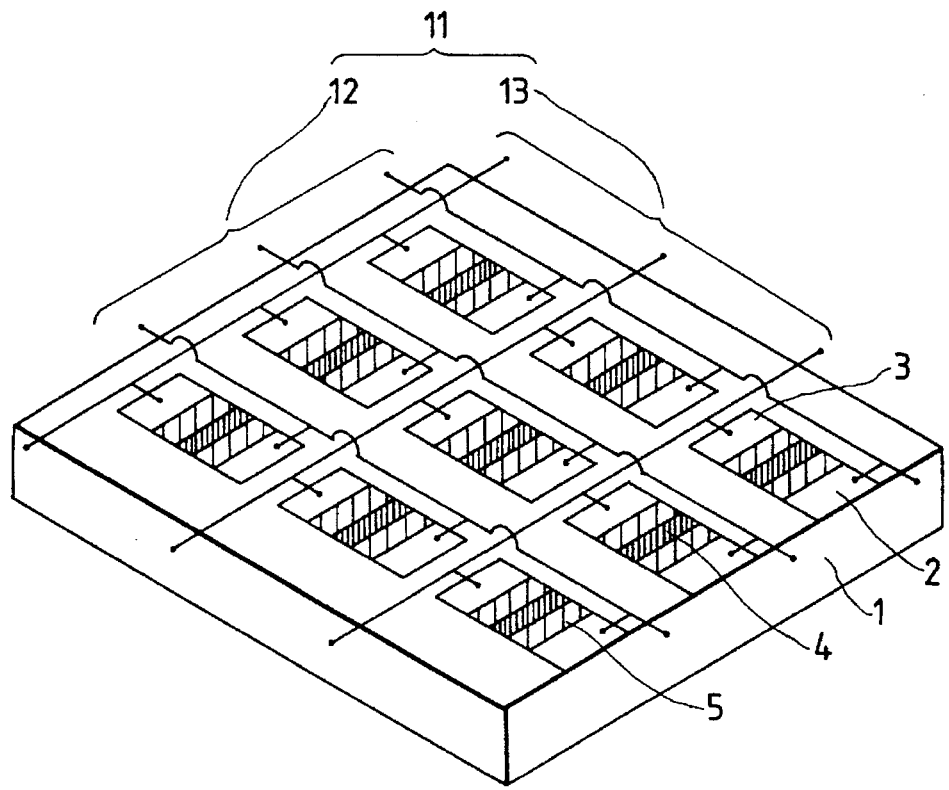
FIG. 10 is a perspective view illustrating schematically the construction of still another electron beam-generating apparatus of the present invention.

The electron beam-generating apparatus and the image-forming apparatus of the present invention are described below in detail. The electron beam-generating apparatus and the image-forming apparatus of the present invention are characterized by use of the above-described electron-emitting devices. The electron beam-generating apparatus of the present invention comprises a plurality of the above electron-emitting devices, and modulation means for modulating electron beams emitted from the electron-emitting devices in accordance of information signals. The embodiments are explained by reference to FIGS. 7, 8, 9, and 10. In these drawings, the numeral 1 denotes an insulating substrate; 2 and 3, electrodes; 4, a region A. (electron-emitting portion); 5, a region B; and 11, a modulation means. In the apparatuses shown in FIGS. 7, 8, and 9, linear electron-emitting devices having a plurality of electron-emitting portions A juxtaposed on the substrate, and a plurality of grid electrodes (modulation electrodes) 11 are placed in an XY matrix with the linear electron-emitting devices. The grid electrodes are placed above the electron-emitting face of the electron-emitting device in FIG. 7; are juxtaposed on the same substrate plane as the electron-emitting devices in FIG. 8; and are laminated on the electron-emitting devices by the aid of the substrate in FIG. 9. In the embodiment shown in FIG. 10, a plurality of electron-emitting devices having each a single electron-emitting portion (region A) are arranged in matrix, and each device is connected to a signal wiring electrode 12 and a scanning wiring electrode 13 as shown in the drawing. This construction is called a simple matrix construction, in which the signal wiring electrodes 12 and the scanning wiring electrodes 13 serves as the modulation means. The electron beam-generating apparatuses exemplified above are driven as below. To drive the apparatus illustrated in FIG. 7, 8, or 9, pulsing voltage of 10 to 14 V is applied to the electrodes 2 and 3 of one line of the linear electron-emitting devices to cause emission of electron beams from a plurality of the electron-emitting portions. The emitted electron beams are turned on and off by application of voltage or +20 V to −50 V to the grid electrodes 11 in correspondence with information signals to obtain electron emission corresponding the information signals for the one line. Such operation is conducted sequentially for adjacent lines of linear electron-emitting devices to obtain electron beam emission for one picture image. To drive the apparatus illustrated in FIG. 10, pulsing voltage of 0 V or 7 V is applied with the scanning wiring electrode 13 to the plurality of the electron-emitting devices on one line, and subsequently pulsing voltage of 7 V or 14 V is applied to the signal wiring electrodes 12 in correspondence with information signals to obtain electron emission corresponding to information signal for one line. Such operation is conducted sequentially for adjacent lines to obtain electron beam emission for one picture image.

Figure 11:
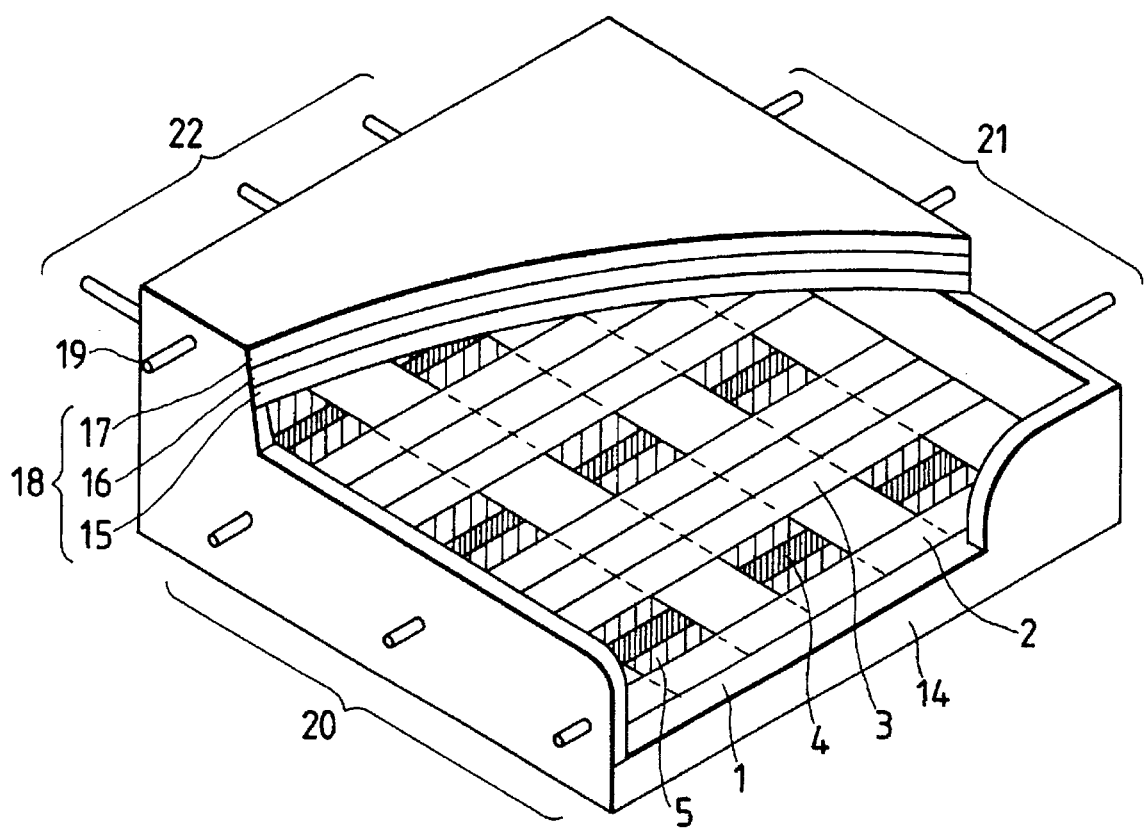
FIG. 11 is a perspective view illustrating schematically the construction of an image-forming apparatus of the present invention.

An image-forming apparatus of the present invention is explained below. The image-forming apparatus of the present invention has a constitution such that an image-forming member is placed on the electron beam emission side of the aforementioned electron beam-generating apparatus. The image-forming member is constituted of a material which causes light emission, color change, electrification, denaturing, etc. on collision of electrons, such as a light-emitting material like a fluorescent material, a resist material, and the like. FIG. 11 illustrates one embodiment of an image-forming apparatus of the present invention. The apparatus of FIG. 11 comprises a rear plate 14 (which may serve also as the aforementioned insulating substrate 1), modulation means 11 (which are shown in a form of grid electrodes as in FIG. 9, but may be the grid electrodes of FIG. 7 or FIG. 8, or the modulation means of FIG. 10), electrodes 2 and 3, electron-emitting portions 4 (regions A), regions-B 5, a face plate 18, a glass plate 17, a transparent electrode 15, and a fluorescent material 16. To drive the image-forming apparatus of the present invention, voltage of 500 V to 10 KV is applied to the image-forming member (transparent electrode 15 in FIG. 11), and then the apparatus is driven in the same manner as driving of the above-described electron beam-generating apparatus, thus an image corresponding to information signals being obtained on the image-forming member (fluorescent image in FIG. 11). In the case where the image-forming member is made of a light-emitting material such as a fluorescent material, a full-color image display can be obtained by using three primary color-emitting materials of red, green, and blue for one picture device. The electron beam-generating apparatus and the image-forming apparatus described above are usually driven at a vacuum degree of $10^{-4}$ to $10^{-9}$ torr.

The present invention is described below in more detail by reference to Examples.

EXAMPLE 1

FIG. 1 shows a plan view of the electron-emitting device of this Example. FIG. 2 is a sectional view at 2A—2A in FIG. 1. The device comprises an insulating substrate 1, electrodes 2 and 3, a region-A 4, and regions-B 5. The electron-emitting device of this example was prepared in a manner as described below.

Figure 12A:
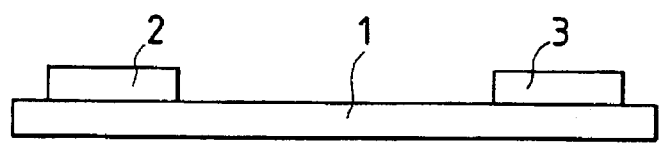
FIGS. 12A to 12C are sectional views for explaining a method of preparation of an electron-emitting device of the present invention.
Figure 12B:
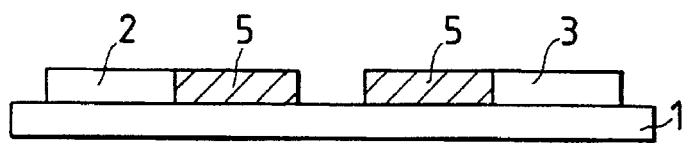
Figure 12C:
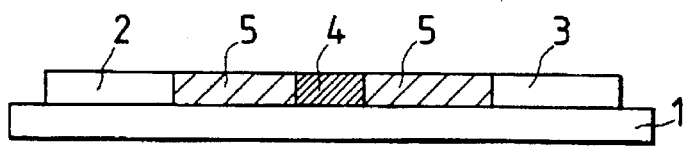

(1) A quartz substrate as the insulating substrate 1 was cleaned sufficiently with an organic solvent, and on the face of the substrate 1, electrodes 2 and 3 were formed (see FIG. 12A). Metallic nickel was used as the material for the electrode. The spacing W between the electrodes was 500 μm, the length L of the electrodes was 300 μm, and the thickness thereof was 1000 Å. (2) Organic palladium (ccp-4230, made by Okuno Seiyaku K. K.) was applied at desired positions by dipping as shown in FIG. 12B, and the applied matter was heat-treated at 300° C. to form a fine particle film 5 (region B) composed of fine particles of palladium oxide (PdO). The widths $W_{21}$ and $W_{22}$ of the region B were respectively 249 μm. The electric conductivity ($\sigma_2$) of the palladium oxide is $100\Omega^{-1}m^{-1}$. (3) A liquid dispersion of tin oxide ($SnO_2$: 1 g, MEK/cyclohexanone =3/1: 1000 cc, butyral: 1 g) was applied between the fine particle film 5 (region B) and heat treated in the same manner as in the procedure of above (2) to form a fine particle film 4 (region A) as shown in FIG. 12C. The width $W_1$ of the region A was 2 μm. The electric conductivity ($\sigma_1$) of the tin oxide was $2500\Omega^{-1}m^{-1}$. In the device of this Example formed through the steps of (1) to (3), $\sigma_2$ ($=100\Omega^{-1}m^{-1}$)≮$\sigma_1$ ($=2500\Omega^{-1}m^{-1}$), and ($\sigma_1 \cdot W_2$)/($\sigma_2 \cdot W_1$)=($\sigma_1 \cdot S_2$)/($\sigma_2 \cdot S_1$)=6225. The emission of electron from the region A was confirmed on application of voltage of 14 V between the electrodes 2 and 3 in a vacuum of $1 \times 10^{-5}$ torr.

EXAMPLE 2

FIG. 3 is a plan view of the electron-emitting device of this Example. In FIG. 3 also, the numeral 1 denotes an insulating substrate; 2 and 3, electrodes; 4, a region A; and 5, a region B. The electron-emitting device of this Example was prepared in the same manner as in Example 1. Accordingly, the relation of $\sigma_1 \text{Λ} \sigma_2$ was satisfied, and ($\sigma_1 \cdot W_2$)/($\sigma_2 \cdot W_1$) =($\sigma_1 \cdot S_2$)/($\sigma_2 \cdot S_1$)=6225. The emission of electron from the region A was confirmed on application of voltage of 14 V between the electrodes 2 and 3 in a vacuum of $1 \times 10^{-5}$ torr.

EXAMPLE 3

An electron-emitting device was prepared in a manner as below.

(1) Indium oxide ($In_2O_3$) was deposited at a desired position on a surface of an insulating substrate 1 by gas deposition to form a fine particle film 5 (region B) of thickness of 45 μm composed of fine particles of indium oxide (having particle diameter of 20 Å to 200 Å). The electric conductivity ($\sigma_2$) of the indium oxide is $1 \times 10^3 \Omega^{-1} m^{-1}$.

(2) On the indium oxide fine particle film 5 formed above, a fine particle film 4 (region A) composed of fine particles of silver (Ag, having particle diameter of 20 Å to 250 Å) was formed in a thickness of 10 μm in the same manner as in the step (1) above. The electric conductivity ($\sigma_1$) of the silver is $6 \times 10^7 \Omega^{-1} m^{-1}$.

(3) On the silver fine particle film 4, an indium oxide fine film 5 (region B) was formed in a thickness of 45 μm in the same manner as in the step (1) above. Subsequently, the electrodes 2 and 3 were formed by oblique vapor deposition. The length L of the electrodes was 500 μm.

The device of this Example prepared through the steps of (1) to (3) emits electron from the side face of the stepped portion comprising the fine particle film 4 (region A) and the fine particle films 5 (regions B). Therefore, the thickness or the fine particle film corresponds to the width of each region between the electrodes. Thus the width ($W_1$) of the region A was 10 μm, the width of each region B ($W_{21}$ and $W_{22}$) was 45 μm. As described above, in the device of this Example, $\sigma_1$ ($=6 \times 10^7 \Omega^{-1}m^{-1}$) Λ$\sigma_2$ ($=1 \times 10^3 \Omega^{-1}m^{-1}$) and ($\sigma_1 \cdot W_2$)/

$(\sigma_2 \cdot W_1)=(\sigma_1 \cdot S_2)/(\sigma_2 \cdot S_1)=5.4\times 10^5$. The emission of electron from the region A was confirmed on application of voltage of 14 V between the electrodes 2 and 3 in a vacuum of $1\times 10^{-5}$ torr.

EXAMPLE 4

An electron-emitting device was prepared in the same manner as Example 1 except that, in FIGS. 1 and 2, the fine particle film 4 (region A) was formed from fine particles of Pd (particle diameter: 10 Å to 100 Å), and the fine particle film 5 (region B) was formed from $SnO_2$ (particle diameter: 100 Å to 1000 Å). The electric conductivity $(\sigma_1)$ of the Pd is $7\times 10^6 \Omega^{-1} m^{-1}$, and the electric conductivity $(\sigma_2)$ of the $SnO_2$ is $2.5\times 10^3 \Omega^{-1} m^{-1}$. Accordingly, the relation of $\sigma 1 \wedge \sigma_2$ was satisfied, and $(\sigma_1 \cdot W_2)/(\sigma_2 \cdot W_1)=(\sigma_1 \cdot S_2)/(\sigma_2 \cdot S_1)= 6.97\times 10^5$. The emission of electron from the region A of the device prepared above was confirmed on application of voltage of 14 V between the electrodes 2 and 3 in a vacuum of $1\times 10^{-5}$ torr.

EXAMPLE 5

Figure 13:
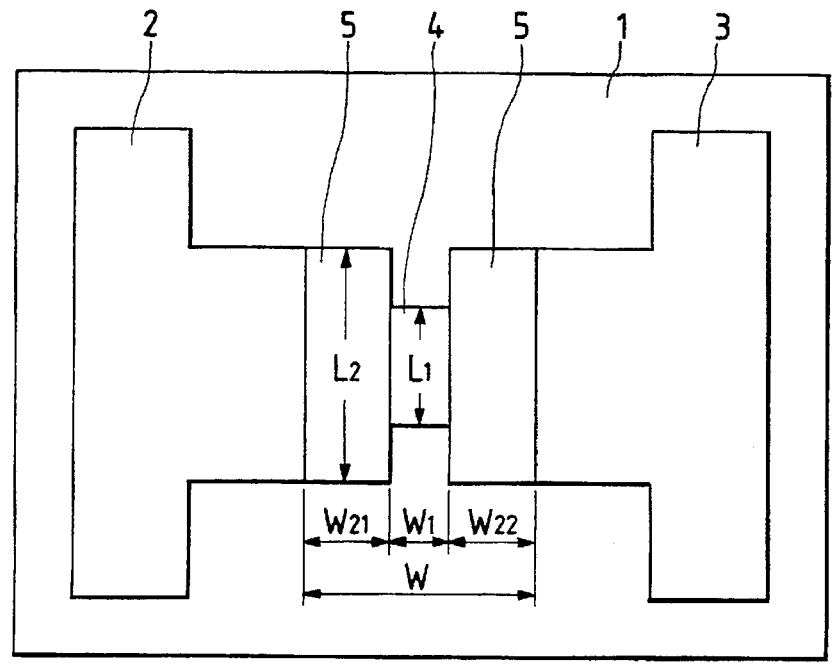
FIG. 13 is a plan view illustrating schematically the construction of still another electron-emitting device of the present invention.

FIG. 13 shows a plan view of the electron-emitting device of the present invention. In FIG. 13 also, the numeral 1 denotes an insulating substrate; 2 and 3, electrodes; 4, a region A; and 5, a region B. The electron-emitting device of this Example was prepared in a similar manner as in Example 1. In more detail, (1) electrodes 2 and 3 were formed on the face of an insulating substrate 1. In this Example , the spacing W between the electrodes was 400 µm. (2) Fine particle films 5 (region B) composed of fine $ZrB_2$ particles (particle diameter 20 Å to 250 Å) at a disired position by gas deposition. The widths $W_{21}$ and $W_{22}$ of the region B was respectively 249 µm, and the length $L_2$ was 300 µm. The electric conductivity $(\sigma_2)$ of the $ZrB_2$ is $1\times 10^3 \Omega^{-1} m^{-1}$. (3) A fine particle film 4 (region A) composed of fine Pt particles (particle diameter: 10 Å to 200 Å) was formed between the above fine particle films 5 (regions B). The width $W_1$ of the region A was 1 µm, and the length $L_1$ was 150 µm. The electric conductivity $(\sigma_1)$ of the Pt is $9.1\times 10^6 \Omega^{-1} m^{-1}$. Accordingly, in the device of this Example prepared through the steps (1) to (3), $\sigma_1$ (=$9.1\times 106\Omega^{-1} m^{-1}$) $\wedge \sigma_2$ (=$1\times 10^3 \Omega^{-1} m^{-1}$), and $(\sigma_1 \cdot W_2)/(\sigma_2 \cdot W_1)=2.27\times 10^6$, $(\sigma_1 \cdot S_2)/(\sigma_2 \cdot S_1)=4.53\times 10^6$. The emission of electron from the region A of the device prepared above was confirmed on application of voltage of 14 V between the electrodes 2 and 3 in a vacuum of $1\times 10^{-5}$ torr.

EXAMPLE 6

FIG. 14 is a plan view of the electron-emitting device of this Example. In FIG. 14 also, the numeral 1 denotes an insulating substrate; 2 and 3, electrodes; 4, a region A; and 5, a region B. The electron-emitting device of this Example was prepared in the same manner as in Example 3 except that the region A was divided in the length direction of the electrodes 2 and 3; L was 500 µm; $L_1$ and $L_2$ were respectively 150 µm; W was 100 µm, $W_1$ was 10 µm; and $W_{21}$ and $W_{22}$ were respectively 45 µm. Accordingly, the relation of $\sigma_1 \wedge \sigma_2$ was satisfied, and $(\sigma_1 \cdot W_2)/(\sigma_2 \cdot W_1) =2.25\times 10^2$, and $(\sigma_1 \cdot S_2)/(\sigma_2 \cdot S_1)=3.92\times 10^2$. The emission of electron from the plurality of regions A of the device was confirmed on application of voltage of 14 V between the electrodes 2 and 3 in a vacuum of 1×10–5 torr.

EXAMPLE 7

FIG. 15 is a plan view of the electron-emitting device of this Example. In FIG. 15 also, the numeral 1 denotes an insulating substrate; 2 and 3, electrodes; 4, a region A; and 5, a region B. The electron-emitting device of this Example was prepared in the same manner as in Example 1 except that seven regions A were provided in the length direction of the electrodes 2 end 3; L was 1500 µm; $L_1$ to $L_7$ were respectively 100 µm; the widths of $W_{21}$ end $W_{22}$ of the region B were respectively 200 µm; the width $W_1$ of the regions was 2 µm. Accordingly, the relation of $\sigma_1 \wedge \sigma_2$ was satisfied, and $(\sigma_1 \cdot W_2)/(\sigma_2 \cdot W_1)=5.0\times 10^3$, and $(\sigma_1 \cdot S_2)/(\sigma_2 \cdot S_1)=9.37\times 10^3$. The emission of electron from the plurality of regions A of the device was confirmed on application of voltage of 14 V between the electrodes 2 and 3 in a vacuum of $1\times 10^{-5}$ torr.

EXAMPLE 8

The device of this Example was prepared in the same manner as in Example 3 except that, in FIG. 4, the fine particle film 4 (region A) was formed from fine Au particles (particle diameter: 30 Å to 250 Å); the fine particle film 5 (region B) was formed from fine HfB2 (particle diameter: 30 Å to 300 Å); the width $W_1$ of the region A was 0.05 µm; and the width of $W_2$ (=$W_{21}$+$W_{22}$) was 0.3 µm. The electric conductivity $(\sigma_1)$ of the Au is $4.4\times 10^7 \Omega^{-1} m^{-1}$, and the electric conductivity $(\sigma_2)$ of the $HfB_2$ is $1\times 10^3 \Omega^{-1} m^{-1}$. Accordingly, the relation of $\sigma_1 \wedge \sigma_2$ was satisfied, and $(\sigma_1 \cdot W_2)/(\sigma_2 \cdot W_1)=(\sigma_1 \cdot S_2)/(\sigma_2 \cdot S_1)=2.64\times 10^5$. The emission of electron from the region A of the device prepared above was confirmed on application of voltage of 14 V between the electrodes 2 and 3 in a vacuum of $1\times 10^{-5}$ torr.

EXAMPLE 9

The electron-emitting device of this example was prepared in a manner as described below.

Figure 17A:
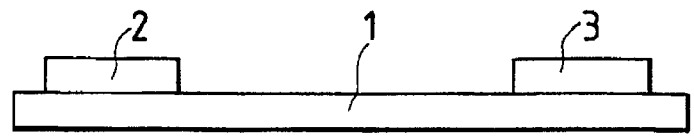
FIGS. 17A to 17C are sectional views for explaining another method of preparation of an electron-emitting device of the present invention.
Figure 17B:
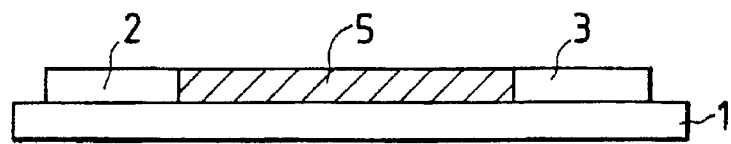
Figure 17C:
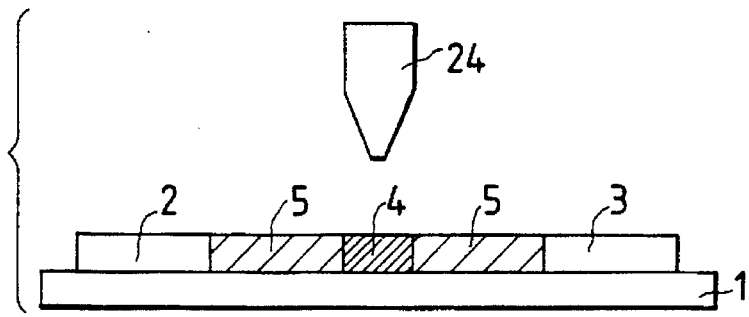

(1) On the face of the substrate 1, electrodes 2 and 3 were formed in the same manner as in Example 1 (see FIG. 17A) except that the spacing W between the electrodes was 4 µm, and the length L of the electrodes was 50 µm. (2) Then organic palladium (ccp-4230, made by Okuno Seiyaku K. K.) was applied at desired positions by spinner coating as shown in FIG. 17B, and the applied matter was heat-treated at 250° C. to form a fine particle film 5 (region B) composed mainly of fine particles of palladium oxide (PdO). The electric conductivity $(\sigma_2)$ of the palladium oxide is $100\Omega^{-1} m^{-1}$. (3) Subsequently, as shown in FIG. 17C, electron beam was projected the fine particle film 5 (region B) was irradiated with electron beam by an irradiation apparatus 24 in vacuo to reduce the desired portion of the fine particle film 5 to form a fine particle film 4 (region A) composed of Pd fine particles. The width $W_1$ of the region A was 0.1 µm. The diameter of the fine Pd particles was from 5 Å to 100 Å. The electric conductivity $(\sigma_1)$ of the Pd oxide is $7.7\times 10^6 \Omega^{-1} m^{-1}$. Although the electron beam was irradiated in vacuo, other reductive atmosphere may be employed provided that the metal oxide constituting the region B is reduced. In place of the electron beam, infrared light, laser beam, or the like may be used. In the device of this Example formed through the steps of (1) to (3), $\sigma_1$ (=$7.7\times 10^6 \Omega^{-1} m^{-1}$) $\wedge \sigma_2$ (=$100\Omega^{-1} m^{-1}$), and $(\sigma_1 \cdot W_2)/(\sigma_2 \cdot W_1)=(\sigma_1 \cdot S_2)/(\sigma_2 \cdot S_1)=3.0\times 10^6$. The emission of electron from the region A was confirmed on application of voltage of 14 V between the electrodes 2 and 3 in a vacuum of $1\times 10^{-5}$ torr.

EXAMPLE 10

The electron-emitting device of this Example was prepared in a manner as described below.

Figure 18A:
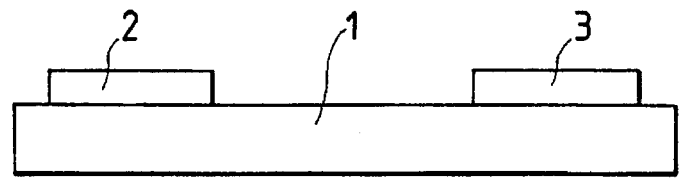
FIGS. 18A to 18C are sectional views for explaining still another method of preparation of an electron-emitting device of the present invention.
Figure 18B:
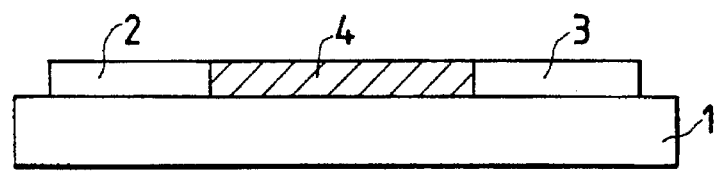
Figure 18C:
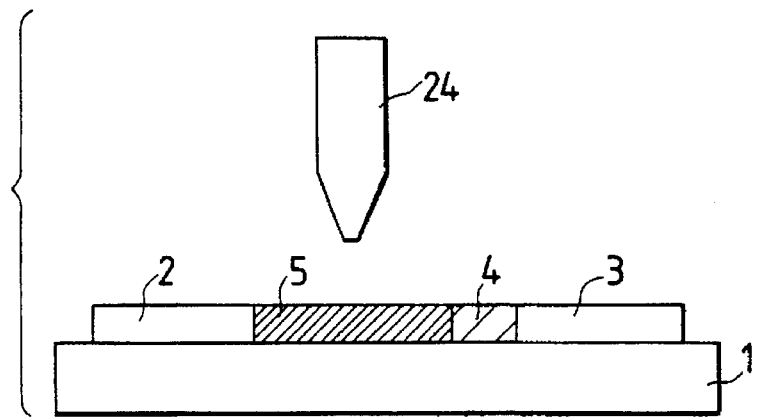

(1) On the face of the substrate 1, electrodes 2 and 3 were formed in the same manner as in Example 9 (see FIG. 18A)

except that the spacing W between the electrodes was 10 µm, and the length L of the electrodes was 200 µm. (2) A fine particle film 4 (region A) composed of fine particles of iron (Fe) was formed at the desired position by gas deposition as shown in FIG. 18B (particle diameter: 30 Å to 150 Å). The electric conductivity ($\sigma_1$) of the iron is $1.03\times10^7\Omega^{-1}m^{-1}$. (3) Subsequently, as shown in FIG. 18C, infrared light was protected from an apparatus 24 to the fine particle film 4 (region A) in the air to oxidize the desired portion of the fine particle film 4 to form a fine particle film 5 (region B) composed of fine particles of iron oxide ($Fe_3O_4$). The width $W_1$ of the region A was 2 µm. The diameter of the fine iron oxide particles was from 50 Å to 300 Å. The width $W_2$ of the region B was 8 µm. The electric conductivity ($\sigma_2$) of the iron oxide is $1\times10^4\Omega^{-1}m^{-1}$. In the device of this Example formed through the steps of (1) to (3), $\sigma_1$ (=$1.03\times10^7\Omega^{-1}m^{-1}$) $\wedge\sigma_2$ (=$1\times10^4\Omega^{-1}m^{-1}$), and ($\sigma_1 \cdot W_2$)/($\sigma_2 \cdot W_1$)=($\sigma_1 \cdot S_2$)/($\sigma_2 \cdot S_1$)=$4.1\times10^3$. The emission of electron from the region A was confirmed on application of voltage of 14 V between the electrodes 2 and 3 in a vacuum of $1\times10^{-5}$ torr.

EXAMPLE 11

Figure 16:
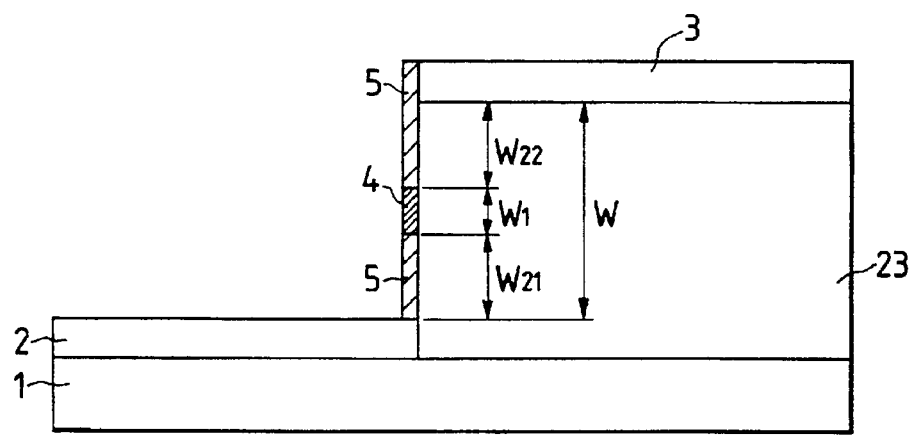
FIG. 16 is a sectional view illustrating schematically the construction of still another electron-emitting device of the present invention.

FIG. 16 shows a sectional view of the electron-emitting device of this Example. In FIG. 16 also, the numeral 1 denotes an insulating substrate; 2 and 3, electrodes; 4, a region A; and 5, a region B, and the numeral 23 denotes a stepped portion-forming layer composed of $SiO_2$. The electron-emitting device of this Example was prepared in a manner as described below.

(1) A quartz substrate as the insulating substrate 1 was cleaned sufficiently with an organic solvent. Thereon, a stepped portion-forming layer 23 composed of $SiO_2$ was formed, and electrodes 2 and 3 were formed by oblique vapor deposition.

(2) A fine particle layer 5 (region B) composed of fine particles of indium oxide ($In_2O_3$) was formed on the side face of the $SiO_2$ 23 by gas deposition (particle diameter: 20 Å to 200 Å). The electric conductivity ($\sigma_2$) of the Indium oxide is $1\times10^3\Omega^{-1}m^{-1}$.

(3) To the fine particle film 5 (region B), electron beam was projected in vacuo in the same manner as in Example 9 to reduce a desired portion of the fine particle film 5 to form a fine particle film 4 (region A) composed of fine In particles. The width of the region A was 0.1 µm, and the particle diameter of the fine In particles was from 10 Å to 120 Å. The electric conductivity ($\sigma_1$) of the In is $1.2\times10^7$ $\Omega^{-1}m^{-1}$.

In the device of this Example formed through the steps of (1) to (3), $\sigma_1$ (=$1.2\times107\Omega-1m-1$) $\wedge\sigma_2$ (=$1\times10^3\Omega^{-1}m^{-1}$), and ($\sigma_1 \cdot W_2$)/($\sigma_2 \cdot W_1$)=($\sigma_1 \cdot S_2$)/($\sigma_2 \cdot S_1$)=$1.08\times10^5$. The emission of electron from the region A was confirmed on application of voltage of 14 V between the electrodes 2 and 3 in a vacuum of $1\times10^{-5}$ torr.

EXAMPLE 12

The electron-emitting device of this Example was prepared in the same manner as in Example 10 except that the fine particle film 4 (region A) was formed from fine particles of zinc (Zn) (particle diameter: 50 Å to 300 Å). The fine particle film 5 (region B) composed of zinc oxide (ZnO) was formed therefrom in a width of 8 µm (particle diameter: 100 Å to 450 Å). The electric conductivity ($\sigma_1$) of the zinc is $1.03\times10^7\Omega^{-1}m^{-1}$, and the electric conductivity ($\sigma_2$) of the zinc oxide is $1.06\times10^{-2}\Omega^{-1}m^{-1}$. Therefore, the relation of $\sigma_1 \wedge \sigma_2$ was satisfied, and ($\sigma_1 \cdot W_2$)/($\sigma_2 \cdot W_1$)=($\sigma_1 \cdot S_2$)/($\sigma_2 \cdot S_1$) =$4.86\times10^8$. The emission of electron from the region A of the device prepared above was confirmed on application of voltage of 14 V between the electrodes 2 and 3 in a vacuum of $1\times10^{-5}$ torr.

EXAMPLE 13

The electron-emitting device of this example was prepared in a manner as described below.

Figure 19:
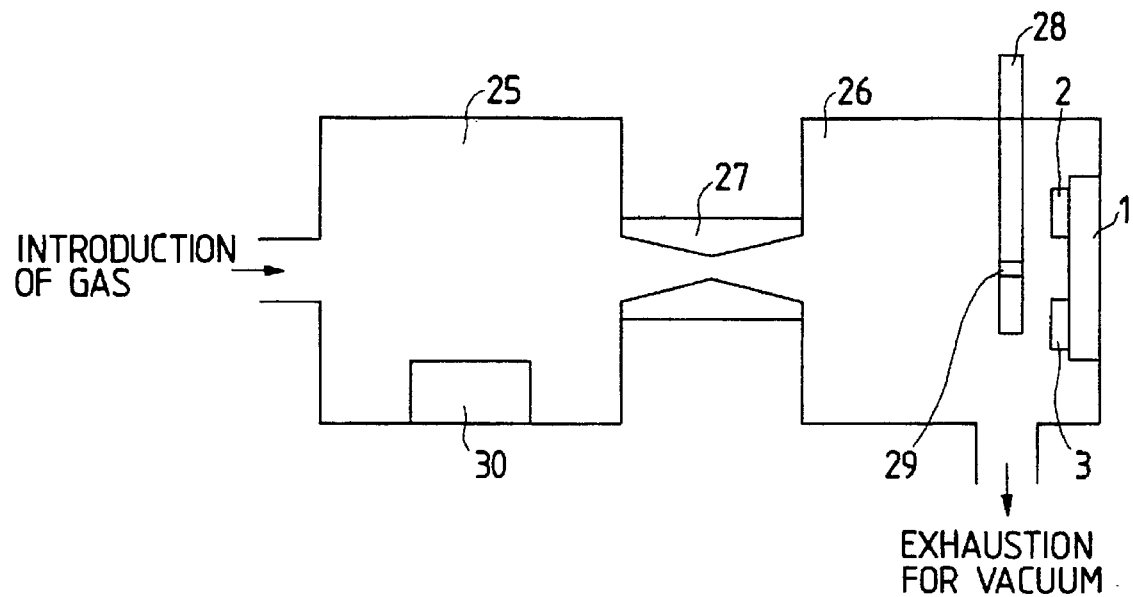
FIG. 19 illustrates an apparatus for preparation of an electron-emitting device of the present invention.

(1) On the face of the substrate 1, electrodes 2 and 3 were formed in the same manner as in Example 9 (see FIG. 18A) except that the spacing W between the electrodes was 200 µm, and the length L of the electrodes was 300 µm. (2) Fine particle films 4 and 5 were formed at the desired positions as shown in FIG. 18B by gas deposition by use of an apparatus shown in FIG. 19. In more detail, the substrate having electrodes thereon formed in the above step (1) was set in the fine particle-depositing chamber 26, and the apparatus was evacuated to a vacuum of $1\times10^{-6}$ torr or below. Then, Ar and $N_2$ gas was introduced the fine particle-forming chamber 25 at the rates of 30 sccm of Ar and 10 sccm of $N_2$. Thereby the pressure of the fine particle-forming chamber became $6\times10^{-2}$ torr, and the pressure of the fine particle-depositing chamber became $1\times10^{-4}$ torr, thus the pressure differing by two decimals. The numeral 30 denotes a sputtering system. The nozzle 27 had a bore diameter of 4 mm. The distance between the nozzle 27 and the substrate 1 was 150 mm, the distance between the deposition mask and the substrate 1 was 2 mm, and the width of the opening 29 of the deposition mask 28 was 10 µm. Fine particulate chromium (Cr) was sputtered by use of the sputtering system, whereby fine particles of chromium nitride (CrN) were formed by reaction with $N_2$ gas, and were deposited onto the substrate 1. During the deposition, the opening 29 of the deposition mask was moved from the end face of the electrode 2 to the position of 180 µm (width of the region B) from the end of the electrode 2. (3) Then Ar gas only was introduced at a rate of 45 sccm to deposit fine particles of chromium (Cr) on the remaining 20 µm (width of the region A). The electric conductivity ($\sigma_1$) of the Cr is $7.76\times10^6\Omega^{-1}m^{-1}$, and the electric conductivity ($\sigma_2$) of the CrN is $1.56\times10^5\Omega^{-1}m^{-1}$. Therefore, in the device of this Example prepared through the steps (1) to (3), the relation of $\sigma_1 \wedge \sigma_2$ was satisfied, and ($\sigma_1 \cdot W_2$)/($\sigma_2 \cdot W_1$)=($\sigma_1 \cdot S_2$)/($\sigma_2 \cdot S_1$)=$4.48\times10^2$. The diameter of the fine Cr particles was 50 Å to 100 Å, and the diameter of the fine CrN particles was 80 Å to 150 Å. The emission of electron from the region A of the device prepared above was confirmed on application of voltage of 14 V between the electrodes 2 and 3 in a vacuum of $1\times10^{-5}$ torr.

EXAMPLE 14

An electron-emitting device was prepared in the same manner as in Example 13 except that the fine particle film 4 (region A) was formed from fine particles of tantalum (Ta) (particle diameter: 200 Å to 250 Å), and the fine particle film 5 (region B) was formed from fine particles of tantalum nitride (TaN) (particle diameter: 280 Å to 350 Å) formed by nitrogenation of fine tantalum particles in the manner in Example 13. The electric conductivity ($\sigma_1$) of the Ta is $7.41\times10^6\Omega^{-1}m^{-1}$, and the electric conductivity ($\sigma_2$) of the TaN is $5.05\times10^5\Omega^{-1}m^{-1}$. Therefore, in the device of this Example, the relation of $\sigma_1 \wedge \sigma_2$ was satisfied, and ($\sigma_1 \cdot W_2$)/($\sigma_2 \cdot W_1$)=($\sigma_1 \cdot S_2$)/($\sigma_2 \cdot S_1$)=$1.32\times10^2$. The emission of electron from the region A of the device prepared above was confirmed on application of voltage of 14 V between the electrodes 2 and 3 in a vacuum of $1\times10^{-5}$ torr.

Comparative Example 1

An electron-emitting device for comparison was formed as below.

(1) On an insulating substrate 1, electrodes 2 and 3 were formed. The spacing W between the electrodes was 5 μm, the length L of the electrodes was 300 μm, and the thickness thereof was 1000 Å.

(2) A liquid dispersion of tin oxide ($SnO_2$: 1 g, MEK/cyclohexanone=3/1: 1000 cc, butyral: 1 g) was applied and heat treated to form a fine particle film (particle diameter: 100 Å to 1000 Å) composed of fine particles of tin oxide. The emission of electron from the region A of the device prepared above was confirmed on application of voltage of 14 V between the electrodes 2 and 3 in a vacuum of $1\times10^{-5}$ torr.

Comparative Example 2

An electron-emitting device for comparison was formed as below.

(1) On an insulating substrate 1, electrodes 2 and 3 were formed. The spacing W between the electrodes was 4 μm, the length L of the electrodes was 300 μm, and the thickness thereof was 1000 Å.

(2) Organic palladium (ccp-4230, made by Okuno Seiyaku K. K.) was applied and heat treated at 300° C. to form a fine particle film composed of fine particles of palladium oxide (PdO) (particle diameter: 10 Å to 150 Å). The emission of electron from the region A of the device prepared above was confirmed on application of voltage of 14 V between the electrodes 2 and 3 in a vacuum of $1\times10^{-5}$ torr.

The electron-emitting devices of Example 1 to 14 and Comparative Example 1 and 2 were tested for 1) device voltage, 2) device current, 3) emission current, 4) the rate of fluctuation of device current, and 5) the rate of fluctuation of emission current. The results are shown in Table 3 and Table 4.

TABLE 3

| Electron-emitting element | Device voltage (V) | Device current (mA) | Emission current (μA) | Fluctuation rate of device current (%) | Fluctuation rate of emission current (%) |
| --- | --- | --- | --- | --- | --- |
| Example No. | | | | | |
| 1 | 14 | 4.0 | 1.3 | 1.8 | 7 |
| 2 | 14 | 3.9 | 1.3 | 1.7 | 8 |
| 3 | 14 | 3.6 | 0.9 | 5.0 | 14 |
| 4 | 14 | 4.2 | 1.3 | 2.0 | 9 |
| 5 | 14 | 1.9 | 0.5 | 1.9 | 8 |
| 6 | 14 | 6.5 | 1.0 | 4.6 | 11 |
| 7 | 14 | 21.2 | 3.3 | 4.9 | 12 |
| 8 | 14 | 3.1 | 0.8 | 3.8 | 11 |
| 9 | 14 | 1.0 | 0.38 | 2.5 | 10 |

TABLE 4

| Electron-emitting element | Device voltage (V) | Device current (mA) | Emission current (μA) | Fluctuation rate of device current (%) | Fluctuation rate of emission current (%) |
| --- | --- | --- | --- | --- | --- |
| Example No. | | | | | |
| 10 | 14 | 2.9 | 0.8 | 3.0 | 11 |
| 11 | 14 | 3.0 | 0.7 | 3.0 | 10 |
| 12 | 14 | 1.9 | 0.5 | 4.1 | 13 |
| 13 | 14 | 3.8 | 0.9 | 2.6 | 11 |
| 14 | 14 | 3.7 | 1.0 | 2.9 | 10 |
| Comparative Example No. | | | | | |
| 1 | 14 | 3.8 | 1.3 | 14 | 26 |
| 2 | 14 | 4.1 | 1.4 | 16 | 28 |

As described above, the electron-emitting device of the present invention is advantageous in that the rate of fluctuation of the device current and the rate of fluctuation of the emission current is extremely low. Further the electron-emitting device of the present invention is superior in electron emission efficiency and has a long life.

EXAMPLE 15

Figure 20:
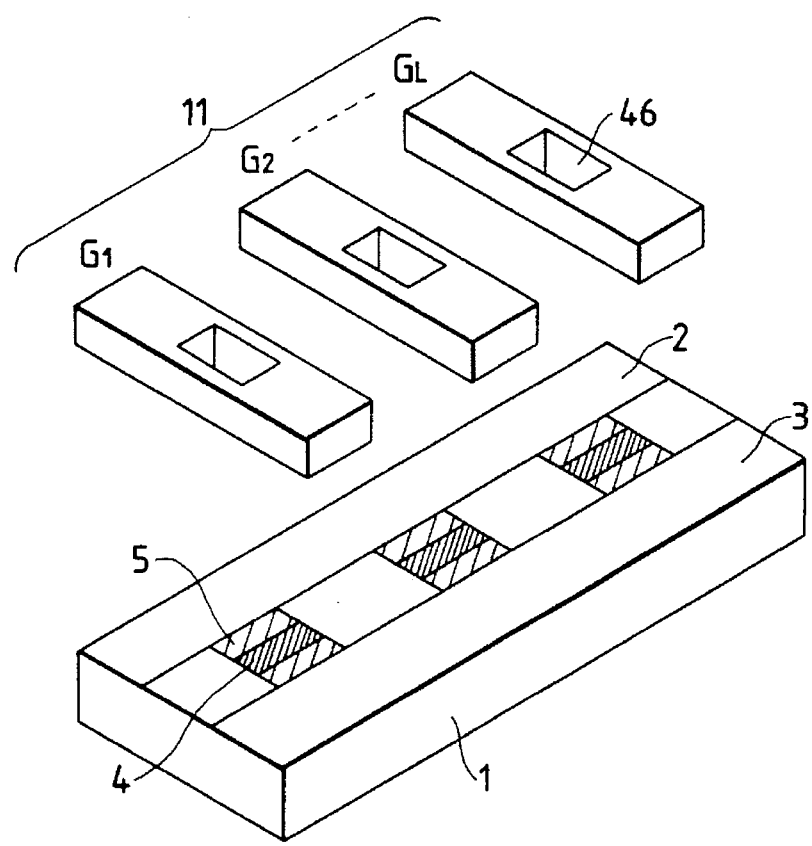
FIG. 20 is a perspective view illustrating schematically the construction of still another electron beam-generating apparatus of the present invention.

An electron beam-generating apparatus was prepared by arranging in a line a plurality of the electron-emitting devices prepared in Example 9 as shown in FIG. 20. The apparatus comprises an insulating substrate (a rear plate) 1, (wiring) electrodes 2 and 3, regions-A (electron-emitting portions) 4, regions-B 5, modulation means (grid electrodes) $G_1$ to $G_L$. The spacing between the insulating substrate 1 and the modulation means 11 was adjusted to 10 μm. The electron beam-generating apparatus was driven as described below. The apparatus was placed in an environment of a vacuum degree of $10^{-5}$ torr. Pulsing voltage of 14 V was applied between the (wiring) electrodes 2 and 3. Then voltage of +20 V was applied to the modulation means in accordance with information signals. Thereby, electron beams were emitted from the plurality of the regions A in accordance with the information signals. The fluctuation rates of the emission currents were measured of the electron beams emitted by driving of the electron beam-generating apparatus in the same manner in Example 1. As the results, the fluctuation rates of the electron beams of the constituting devices were all very low and uniform, and the quantities of emission from the devices were uniform. The life of the apparatus was long.

EXAMPLE 16

Figure 7:
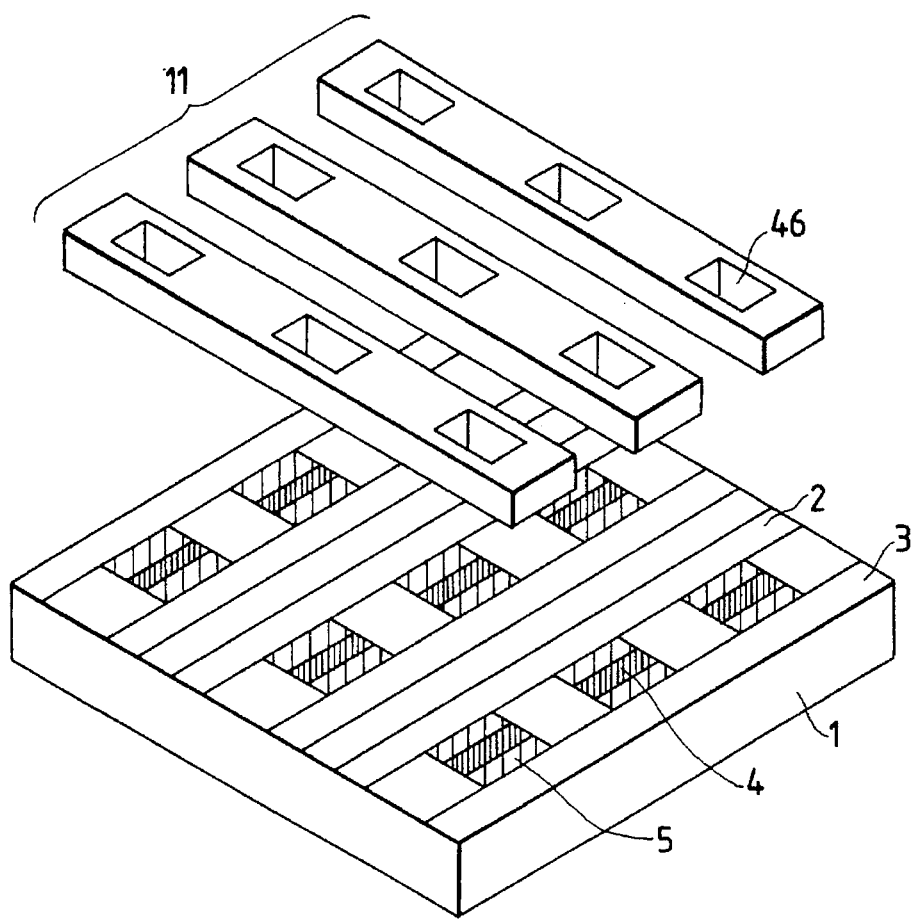
FIG. 7 is a perspective view illustrating schematically the construction of an electron beam-generating apparatus of the present invention.

An electron beam-generating apparatus was prepared by arranging in lines a plurality of linear electron-emitting device groups comprising the electron-emitting devices of Example 9, as shown in FIG. 7. The spacing between the insulating substrate 1 and the modulation means 11 was adjusted to 10 μm. The electron beam-generating apparatus was driven as described below. The apparatus was placed in vacuum of $10^{-5}$ torr. Pulsing voltage of 14 V was applied between the (wiring) electrodes 2 and 3. Then voltage was applied to the modulation means 11 in accordance with information signals: the electron beam being controlled to be off at 0 V or lower, being controlled to be on at +20 V or higher, and varying continuously between +20 V and 0 V. Consequently, electron beams were emitted from a plurality of regions A in a line between the (wiring) electrodes 2 and 3 in accordance with the one line of information. This operation was conducted sequentially for adjacent lines of the electron-emitting devices to obtain electron emission for the entire information signals. The fluctuation rates of the emission current were measured of the respective electron beams emitted by driving of the electron beam-generating apparatus in the same manner in Example 1. As the results, the fluctuation rates of the electron beams of the constituting devices were all very low and uniform, and the quantities of emission from the devices were uniform. The life of the apparatus was long.

EXAMPLE 17

An electron beam-generating apparatus was prepared in the same manner as in Example 16 except that the modulation means (grid electrodes) 11 were placed on the face of the insulating substrate. The emission of electron beam could be made in accordance with information signals by driving the apparatus in a similar manner as in Example 16: the electron beam being controlled to be off at −30 V or lower, being controlled to be on at +20 V or higher, and varying continuously between −30 V and +20 V. The fluctuation rates of the emission current were measured of the respective electron beams emitted by driving of the electron beam-generating apparatus. As the results, the fluctuation rates of the electron beams of the constituting devices were all very low and uniform, and the quantities of emission from the devices were uniform. The life of the apparatus was long.

EXAMPLE 18

An electron beam-generating apparatus was prepared in the same manner as in Example 16 except that the modulation means (grid electrodes) 11 were placed on the face of the insulating substrate opposite to the electron-emitting face of the linear electron-emitting device groups. The emission of electron could be made in accordance with information signals by driving the apparatus in a similar manner as in Example 16: the electron beam being controlled to be off at −25 V or lower, being controlled to be on at +30 V or higher, and varying continuously between−25 V and +30 V. The fluctuation rates of the emission current were measured of the respective electron beams emitted by driving of the electron beam-generating apparatus. As the results, the fluctuation rates of the electron beams of the constituting devices were all very low and uniform, and the quantities of emission from the devices were uniform. The life of the apparatus was long.

EXAMPLE 19

Figure 21:
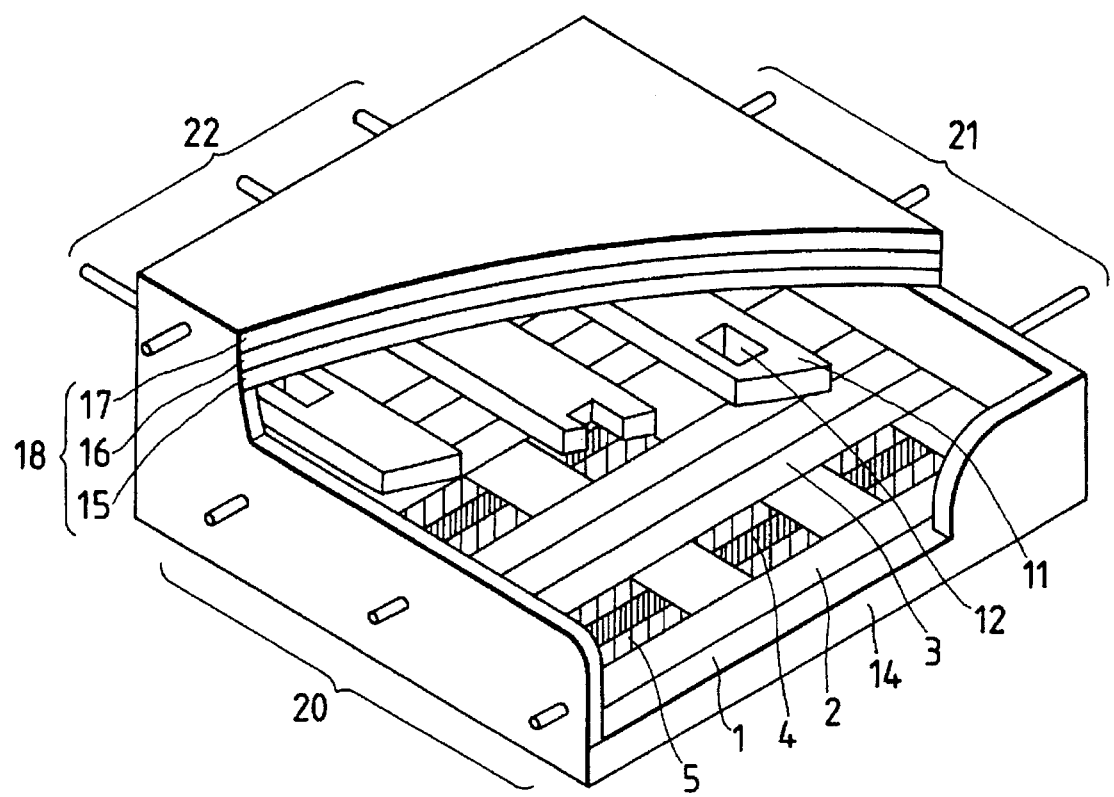
FIG. 21 is a perspective view illustrating schematically the construction of another image-forming apparatus of the present invention.
Figure 23:
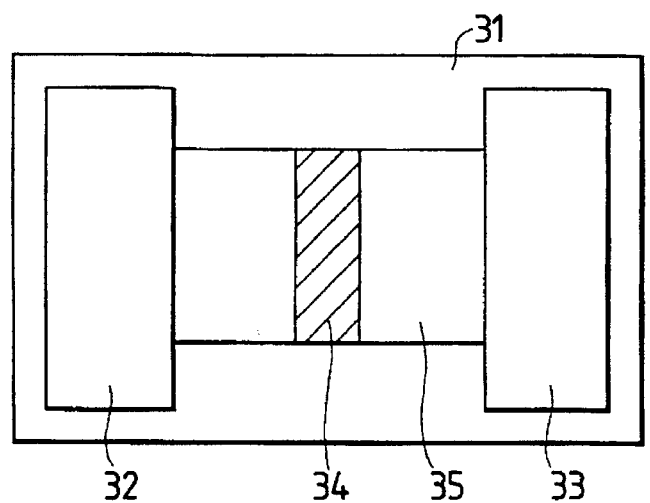
FIG. 23 is a plan view illustrating schematically an electron-emitting device of prior art.

An image-forming apparatus as shown in FIG. 21 was prepared by use of the electron beam-generating apparatus of Example 16. In FIG. 21, the numeral 18 denotes a face plate; 17, a glass plate; 15, a transparent electrode; and 16, a fluorescent member. The spacing between the face plate 18 and the rear plate 14 was adjusted to be 5 mm. The image-forming apparatus was driven in a manner shown below. The panel vessel constructed from the face plate 17 and the rear plate 14 was evacuated to a vacuum degree of $10^{-5}$ torr; the voltage of the fluorescent material face was set through the EV terminal 19 at 5 KV to 10 KV; and pulsing voltage of 14 V was applied to a pair of wiring electrodes 2 and 3. Then voltage was applied to the modulation means through the grid electrode wiring 22 to control the electron beam emission to be on or off in accordance with information signals: the electron beam being controlled to be off at −20 V or lower, being controlled to be on at 0 V or higher, end varying continuously between −20 V and +10 V, thus gradation display being practicable. The electron beams emitted through the modulation means in accordance with the information signals collided against the fluorescent member 16 to display one line of information of the information signal. This operation was sequentially conducted to obtain a display of entire picture. The image displayed by the image-forming apparatus of this Example exhibits extremely low irregularity in luminance and extremely low flickering of the entire display, and gave a sharp image with high contrast.

EXAMPLE 20

Figure 22:
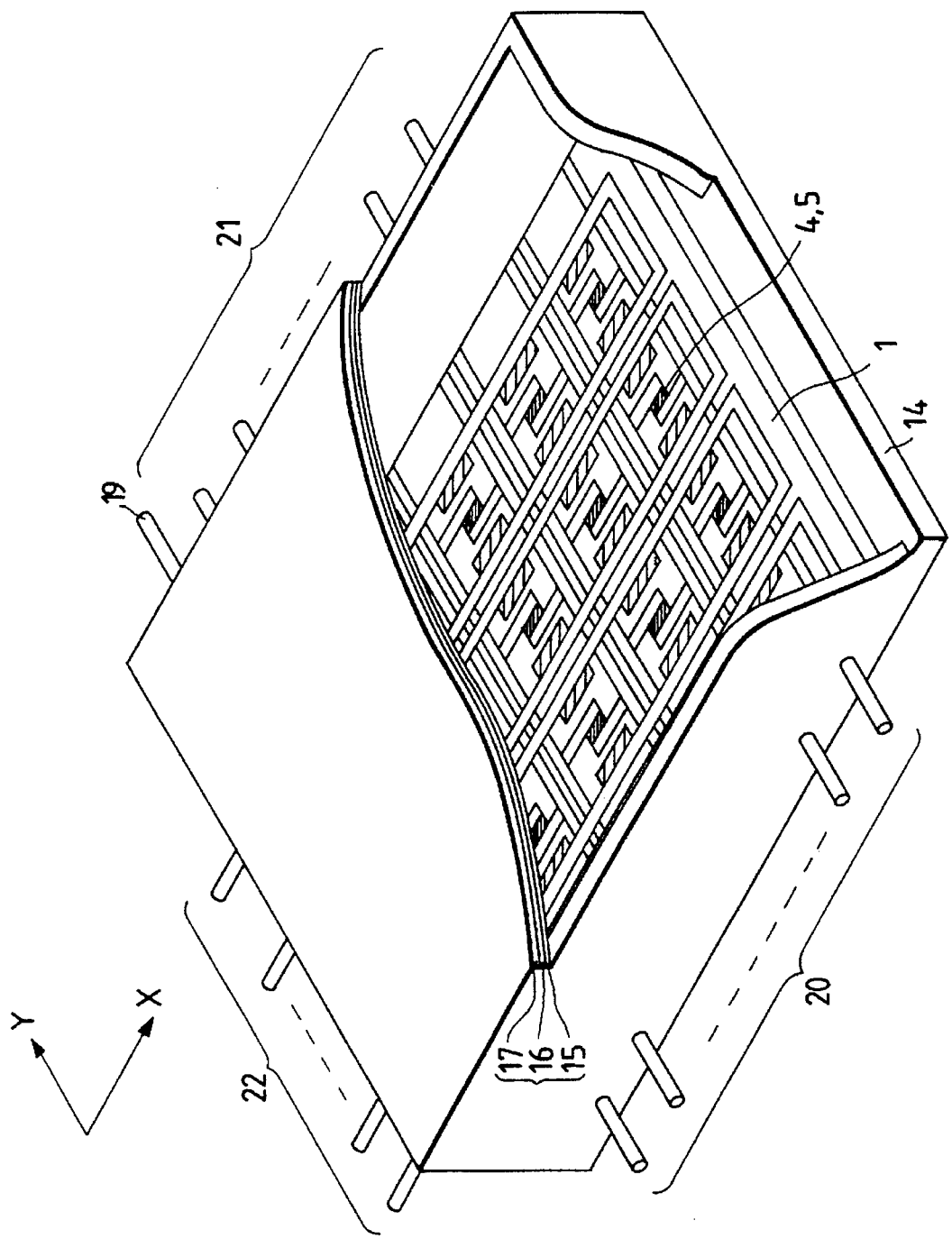
FIG. 22 is a perspective view illustrating schematically the construction of still another image-forming apparatus of the present invention.
Figure 24:
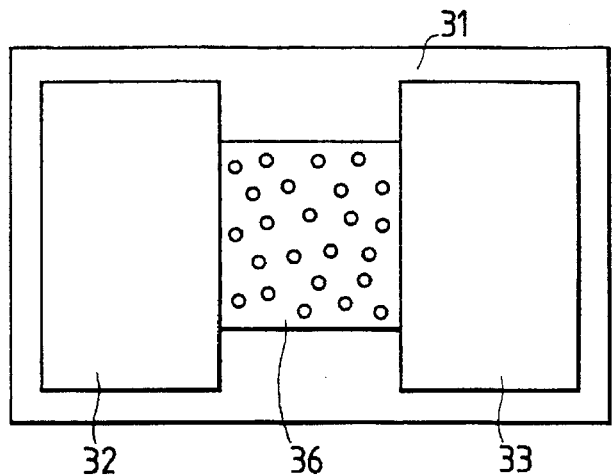
FIG. 24 is a plan view illustrating schematically another electron-emitting device of prior art.
Figure 25:
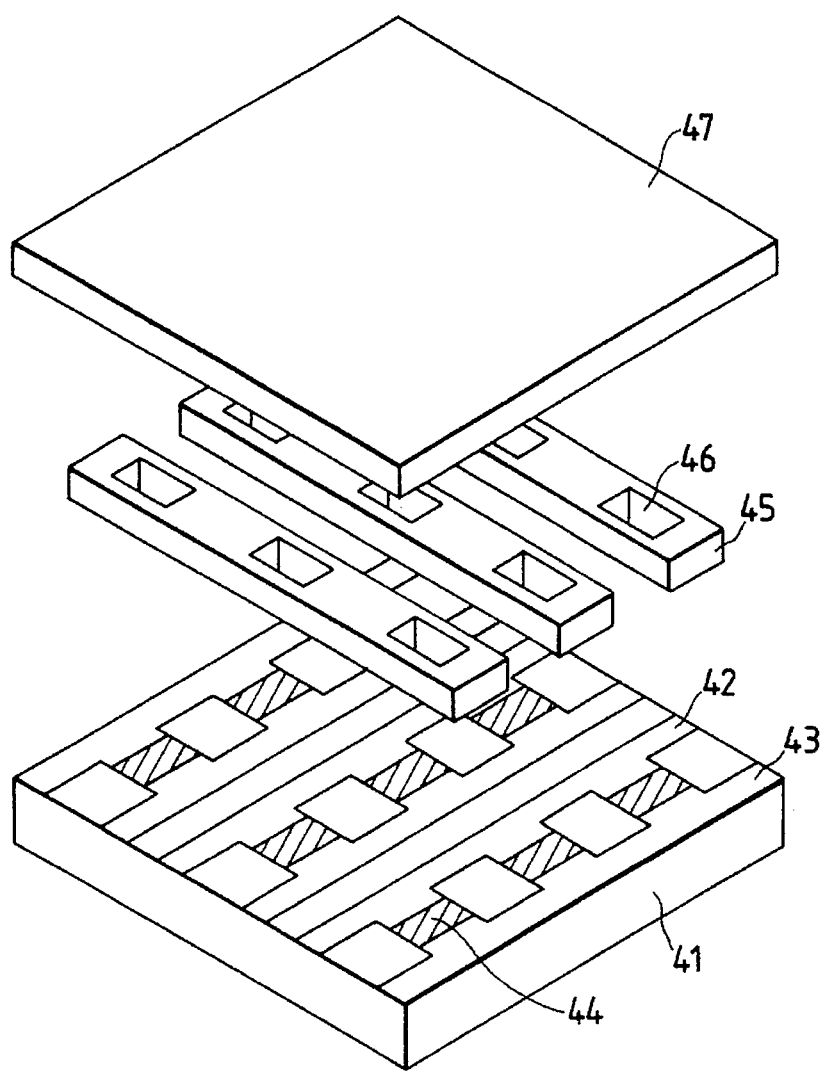
FIG. 25 is a perspective view illustrating schematically an image-forming apparatus of prior art.

An image-forming apparatus as shown in FIG. 22 was prepared by use of the electron beam-generating apparatus of Example 17. The apparatus was driven in the same manner as in Example 19, except that the voltage applied to the modulation means was −50 V or lower to control the electron beam to be off and +10 V or higher to control the electron beam to be on. In the voltage range between −50 V to +10 V, the quantity of the electron of the electron beam varies continuously, thereby gradation of display being practicable. The image displayed by the image-forming apparatus of this Example exhibits extremely low irregularity on luminance and extremely low flickering of the entire display, and a sharp image with high contrast.

EXAMPLE 21

An image-forming apparatus as shown in FIG. 11 was prepared by use of the electron beam-generating apparatus of Example 18. The apparatus was driven in the same manner as in Example 19, except that the voltage applied to the modulation means was −40 V or lower to control the electron beam to be off and +10 V or higher to control the electron beam to be on. In the voltage range between −40 V to +10 V, the quantity of the electron of the electron beam varies continuously, thereby gradation of display being practicable. The image displayed by the image-forming apparatus of this Example exhibits extremely low irregularity on luminance and extremely low flickering of the entire display, and a sharp image with high contrast.

The electron-emitting device and the electron beam-generating apparatus of the present invention have advantages that the fluctuation rate of device current and the fluctuation rate of the emission current is extremely small; the life is long; and the electron emission efficiency is high. Further, in the electron beam-generating apparatus of the present invention, variation of the electron emission characteristics is extremely small among the devices (or among the electron-emitting portion). The image-forming apparatus employing the electron beam-generating apparatus is capable of giving sharp images with high contrast owing to superiority of the respective electron-emitting devices (or electron-emitting portion) in the electron emission characteristics, and less variation of the characteristics. In particular, a displaying apparatus using light-emitting material as the image-forming member gives light images with extremely little irregularity in luminance, and extremely little flickering of the display.

What is claimed is:

1. A method for processing an electron-emitting device having an electron-emitting portion between electrodes on a substrate, comprising:

a step of forming the electron-emitting portion at an electroconductive film located between the electrodes, which step is characterized by a step of irradiating a portion of the electroconductive film with radiation to oxidize or reduce the portion of the electroconductive film.

2. The method according to claim 1, wherein said radiation is provided by an electron beam.

3. The process according to claim 1, wherein said radiation is provided by infrared light.

* * * * *

UNITED STATES PATENT AND TRADEMARK OFFICE
CERTIFICATE OF CORRECTION

PATENT NO. : 5,645,462
DATED : July 8, 1997
INVENTOR(S) : BANNO ET AL.

It is certified that error appears in the above-identified patent and that said Letters Patent is hereby corrected as shown below:

Column 1

Line 61, "electrode" should read --electrodes--.

Column 2

Line 33, "a a" should read --a--.

Column 3

Line 23, "color" should read --colors--; and
Line 39, "schmatically" should read --schematically--.

Column 4

Line 43, "an" should read --a--.

Column 6

Line 7, "It" should read --Ir--; and
Line 17, "be" (second occurrence) should be deleted.

Column 7

Line 1, "end" should read --and--; and
Line 21, "reasons :" should read --reasons:--.

Column 10

Line 11, "$100\Omega^{31}$ $^1m^{-1}$. should read --$100\Omega^{-1}m^{-1}$--; and
Line 20, "1)," should read --$^1$),--.

UNITED STATES PATENT AND TRADEMARK OFFICE
CERTIFICATE OF CORRECTION

PATENT NO. : 5,645,462
DATED : July 8, 1997
INVENTOR(S) : BANNO ET AL.

It is certified that error appears in the above-identified patent and that said Letters Patent is hereby corrected as shown below:

<u>Column 11</u>

Line 29, "Example ," should read --Example,--; and
    Line 31, "disired" should read --desired--; and
    Line 33, "was" (first occurence) should read --were--; and
    Line 62, "1x10-5" should read $--1 \times 10^{-5}--$.

<u>Column 12</u>

Line 5, "end" should read --and--; and
    Line 6, "end" should read --and--; and
    Line 8, "regions" should read --region A--.

Signed and Sealed this

Thirty-first Day of March, 1998

Attest:

BRUCE LEHMAN

*Attesting Officer*    *Commissioner of Patents and Trademarks*